(12) United States Patent
Kanji et al.

(10) Patent No.: US 11,919,639 B2
(45) Date of Patent: Mar. 5, 2024

(54) METHODS AND SYSTEMS FOR CLOUD-BASED MANAGEMENT OF IMAGES CAPTURED BY AERIAL VEHICLES

(71) Applicant: AeroVironment, Inc., Arlington, VA (US)

(72) Inventors: Nazlin Kanji, Simi Valley, CA (US); Greg Aragon, Simi Valley, CA (US); Carolyn Hall, Simi Valley, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 169 days.

(21) Appl. No.: 17/486,067

(22) Filed: Sep. 27, 2021

(65) Prior Publication Data

US 2022/0009631 A1    Jan. 13, 2022

Related U.S. Application Data

(63) Continuation of application No. 16/262,517, filed on Jan. 30, 2019, now Pat. No. 11,155,348.

(60) Provisional application No. 62/624,104, filed on Jan. 30, 2018.

(51) Int. Cl.
*B64C 39/02* (2023.01)
*B64U 70/80* (2023.01)
*B64U 101/30* (2023.01)
*G06F 16/58* (2019.01)
*G06F 21/56* (2013.01)

(52) U.S. Cl.
CPC ............ *B64C 39/024* (2013.01); *G06F 16/58* (2019.01); *G06F 21/56* (2013.01); *B64U 70/80* (2023.01); *B64U 2101/30* (2023.01)

(58) Field of Classification Search
CPC ....... B64C 39/024; G06F 16/58; G06F 21/56; B64U 70/80; B64U 210/30
See application file for complete search history.

(56) References Cited

U.S. PATENT DOCUMENTS 9,792,557 B2 * 10/2017 Mathur .................... G06N 7/01
2015/0172534 A1 * 6/2015 Miyakawa ............. H04N 23/80
  348/222.1
2018/0151045 A1   5/2018 Kim et al.
(Continued)

OTHER PUBLICATIONS

P. Tripicchio, M. Satler, G. Dabisias, E. Ruffaldi and C. A. Avizzano, "Towards Smart Farming and Sustainable Agriculture with Drones," 2015 International Conference on Intelligent Environments, Prague, Czech Republic, 2015, pp. 140-143 (Year: 2015).*

*Primary Examiner* — Peter D Nolan
*Assistant Examiner* — Mikko Okechukwu Obioha
(74) *Attorney, Agent, or Firm* — Concept IP LLP; Pejman Yedidsion; Eric Aagaard

(57) ABSTRACT

Systems, devices, and methods for receiving image data; transferring the captured image data to a server having a processor and addressable memory via a network-connected computing device; storing the captured image data on the server; generating captured image metadata based on the stored captured image data; providing access to the captured image data and captured image metadata via an image management component; displaying, by the image management component, the captured image data; and filtering, by the image management component, the captured image data based on the generated captured image metadata.

20 Claims, 20 Drawing Sheets

(56) References Cited

U.S. PATENT DOCUMENTS

2020/0285251 A1    9/2020    Anishchenko et al.
2021/0034866 A1    2/2021    Appel et al.
2023/0079285 A1*  3/2023    Umeda ................ H04N 23/80
                                                           348/207.99

* cited by examiner

FIG. 13

METHODS AND SYSTEMS FOR CLOUD-BASED MANAGEMENT OF IMAGES CAPTURED BY AERIAL VEHICLES

CROSS-REFERENCE TO RELATED APPLICATIONS

This application is a continuation of U.S. non-provisional patent application Ser. No. 16/262,517, filed Jan. 30, 2019, which claims priority to and the benefit of U.S. Provisional Patent Application No. 62/624,104, filed Jan. 30, 2018, the contents of all of which are hereby incorporated by reference herein for all purposes.

TECHNICAL FIELD

Embodiments relate generally to aerial vehicles, and more particularly to storage of images captured by aerial vehicles.

BACKGROUND

Aerial vehicles may take-off vertically, transition from vertical flight to horizontal flight, and fly forward horizontally. As aerial vehicles have grown in size and complexity, the amount of land covered, and data that can be captured by aerial vehicles has increased.

SUMMARY

A method embodiment may include: receiving image data; transferring the captured image data to a server having a processor and addressable memory via a network-connected computing device; storing the captured image data on the server; generating captured image metadata based on the stored captured image data; providing access to the captured image data and captured image metadata via an image management component; displaying, by the image management component, the captured image data; and filtering, by the image management component, the captured image data based on the generated captured image metadata.

In additional method embodiments, prior to receiving image data, the method may include capturing image data via a vertical take-off and landing (VTOL) aerial vehicle. The VTOL aerial vehicle may have a plurality of sensors. The plurality of sensors may include an RGB sensor. The plurality of sensors may include a LIDAR sensor. The plurality of sensors may include one or more multi-spectral cameras. Additional method embodiments may include: co-registering, by the image management component, the captured image data with at least one pre-loaded image to a high level of precision. Additional method embodiments may include: correlating, by the image management component, a first captured image data with a second captured image data. Additional method embodiments may include: displaying, by the image management component, both the first and the second captured image data, where a visual dividing line may separate the first captured image data from the second captured image data, and the visual dividing line may be moveable by a user. Additional method embodiments may include: filtering, by the image management component, the displayed captured image data based on a plurality of spectrums selected by the user.

Another method embodiment may include: defining a ground region for capturing one or more images; receiving image data of the defined ground region from at least one of: an aerial vehicle and one or more satellite images; associating each received image data from the one or more satellites with a respective latitude and longitude; co-locating each received image data from the aerial vehicle with the received image data from the one or more satellites; processing the image data; storing the processed image data; and viewing the stored image data via a survey component.

In additional method embodiments, the aerial vehicle may be a vertical take-off and landing (VTOL) aerial vehicle and/or VTOL unmanned aerial vehicle (UAV). In some method embodiments, the received image data may include multi-spectral images of the pre-defined ground region, and the multi-spectral images may include at least one of: red, green, blue, infra-red, and ultra-violet spectrums. Prior to storing the image data, the method may include: verifying an integrity of the received image data, where verifying the integrity of the received image data may include scanning the received image data for viruses. Additional method embodiments may include: adding at least one of: a season date range for the defined ground region, one or more crop types for the defined ground region, one or more tags to the stored image data, and one or more notes to the stored image data via a dashboard component. Additional method embodiments may include: determining a canopy coverage data of the defined ground region based on the stored image data, where the determined canopy coverage is based on a percent of the defined ground region that is covered by vegetation; determining an anomaly level of the defined ground region based on the stored image data, where the determined anomaly level may be based on a percent of the defined ground region that may have anomalies; and sending a message when the determined anomaly level exceeds a set amount. Additional method embodiments may include: generating a normalized difference vegetation index (NDVI) profile of the defined ground region based on the stored image data.

Another method embodiment may include: defining a ground region for capturing one or more images; receiving image data of the defined ground region from at least one of: an aerial vehicle and one or more satellite images, where the aerial vehicle may be a vertical-take-off and landing (VTOL) aerial vehicle, where the received image data may include multi-spectral images of the pre-defined ground region, where the multi-spectral images may include at least one of: red, green, blue, infra-red, and ultra-violet spectrums; associating each received image data from the one or more satellites with a respective latitude and longitude; co-locating each received image data from the aerial vehicle with the received image data from the one or more satellites; verifying an integrity of the received image data, where verifying the integrity of the received image data may include scanning the received image data for viruses; processing the verified image data; storing the processed image data; adding at least one of: a season date range for the defined ground region, one or more crop types for the defined ground region, one or more tags to the stored image data, and one or more notes to the stored image data via a dashboard component; viewing the stored image data via a survey component; determining a canopy coverage data of the defined ground region based on the stored image data, where the determined canopy coverage may be based on a percent of the defined ground region that is covered by vegetation; determining an anomaly level of the defined ground region based on the stored image data, where the determined anomaly level may be based on a percent of the defined ground region that may have anomalies; sending a message when the determined anomaly level exceeds a set amount; and generating a normalized difference vegetation index (NDVI) profile of the defined ground region based on the stored image data.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 13 depicts an illustration of a report generation screen, in accordance with an embodiment of the invention;

DETAILED DESCRIPTION

Methods and systems for utilizing cloud-based systems to manage data captured by aerial vehicles may allow users to better gather information relating to the lands flown over. The disclosed system and method may include capturing images, light imaging detection and ranging (LIDAR) and/or other sensor data via aerial vehicles where the aerial vehicle may have a plurality of sensors including RGB, LIDAR and multi-spectral cameras, transferring the captured image and/or LIDAR data, storing the captured data on the server, generating maps and analytics based on the captured data, and providing access to the captured data, maps and analytics via an data management component, where the data management component may display the captured image data, maps and analytics and provide tools to filter and access data in multiple ways based on user provided and computer-generated metadata. In another embodiment, the data management component may further co-register the images to each other to a high level of precision using automated algorithms. Image co-registration is the process of geometrically aligning two or more images to integrate or fuse corresponding pixels that represent the same objects.

In many embodiments, the image management component further correlates a first captured image data with a second captured image data, and displays both the first and the second captured image data, where a visual dividing line may separate the first captured image data from the second captured image data, and the visual dividing line may be moveable by a user. In yet another embodiment, the image management component may further filter the displayed captured image data based on one or more spectrums selected by the user.

Figure 1:
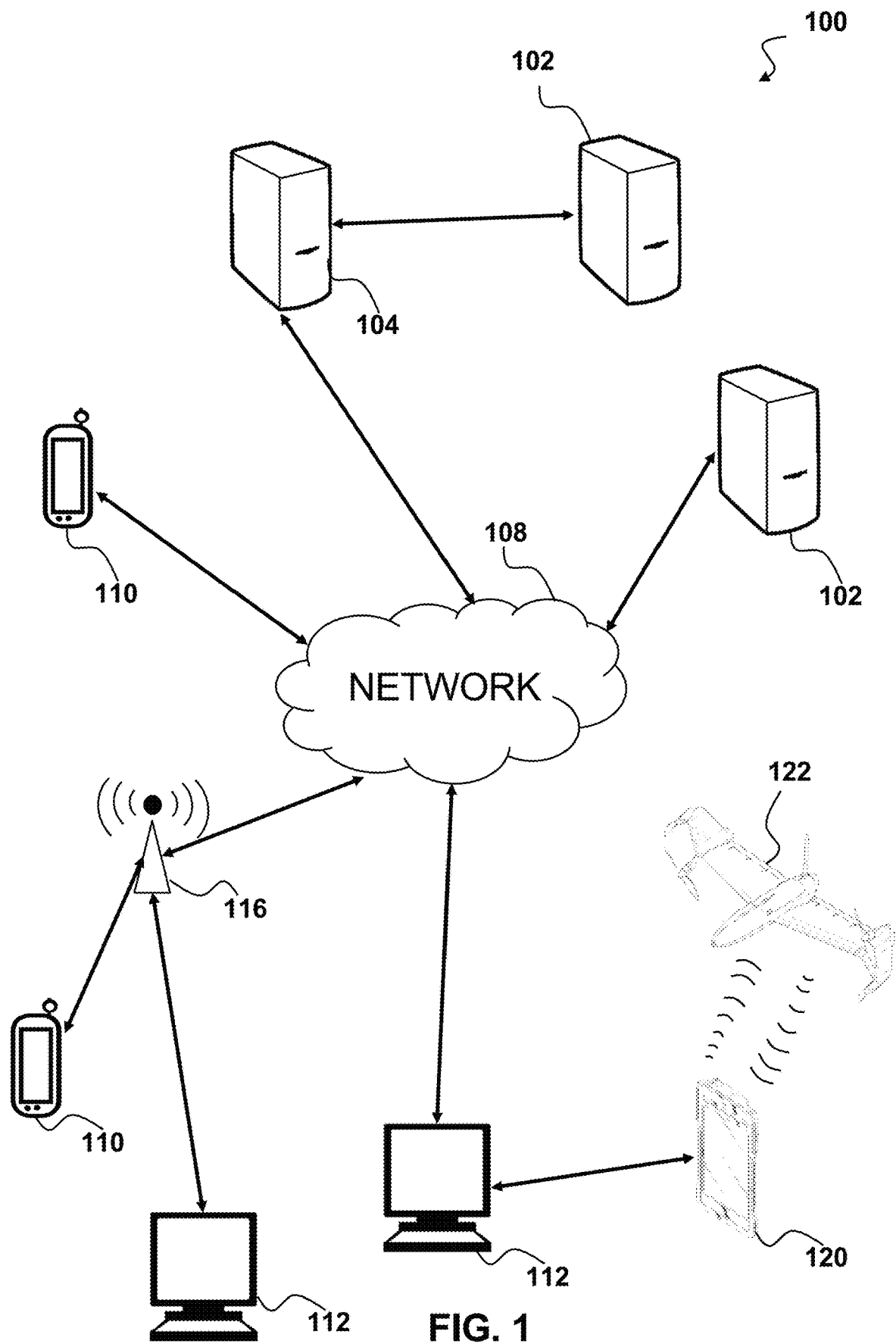
FIG. 1 depicts a cloud-based aerial data management system.

FIG. 1 depicts a cloud-based aerial data management system 100. In many embodiments, the system 100 comprises a plurality of servers 102 that may collect and/or contain data related to aerial vehicle software. In a number of embodiments, the cloud-based server 104 is connected to a network 108, which may include the Internet. In numerous embodiments, the cloud-based server 104 may be Amazon Web Services (AWS) servers 102 from Amazon.com Inc., of Seattle, Washington. In additional embodiments, the management system 100 may have image management software accessible on personal computers 112. In certain additional embodiments, personal computers 112 may be connected directly to the network 108 or through a wireless access point 116 that is itself connected to the network 108. In still additional embodiments, the image management software may be installed and/or accessible via a mobile computing device 110 that may be connected to the network 108 either directly or through a wireless access point 116. In further embodiments, the cloud-based server 104 may be in communication with the image management software installed on any of a mobile computing device 110, personal computer 112, or a ground control station 120. In still further embodiments, the ground control station 120 is in communication with an aerial vehicle 122. In still yet further embodiments, the aerial vehicle 122 may capture images that are transferred to the cloud-based server 104 for processing. In still additional embodiments, processed images captured by an aerial vehicle 122 may be accessed from the cloud-based server 104 through software accessible from a personal computer 112, mobile computer device 110, and/or a ground control station 120.

Figure 2:
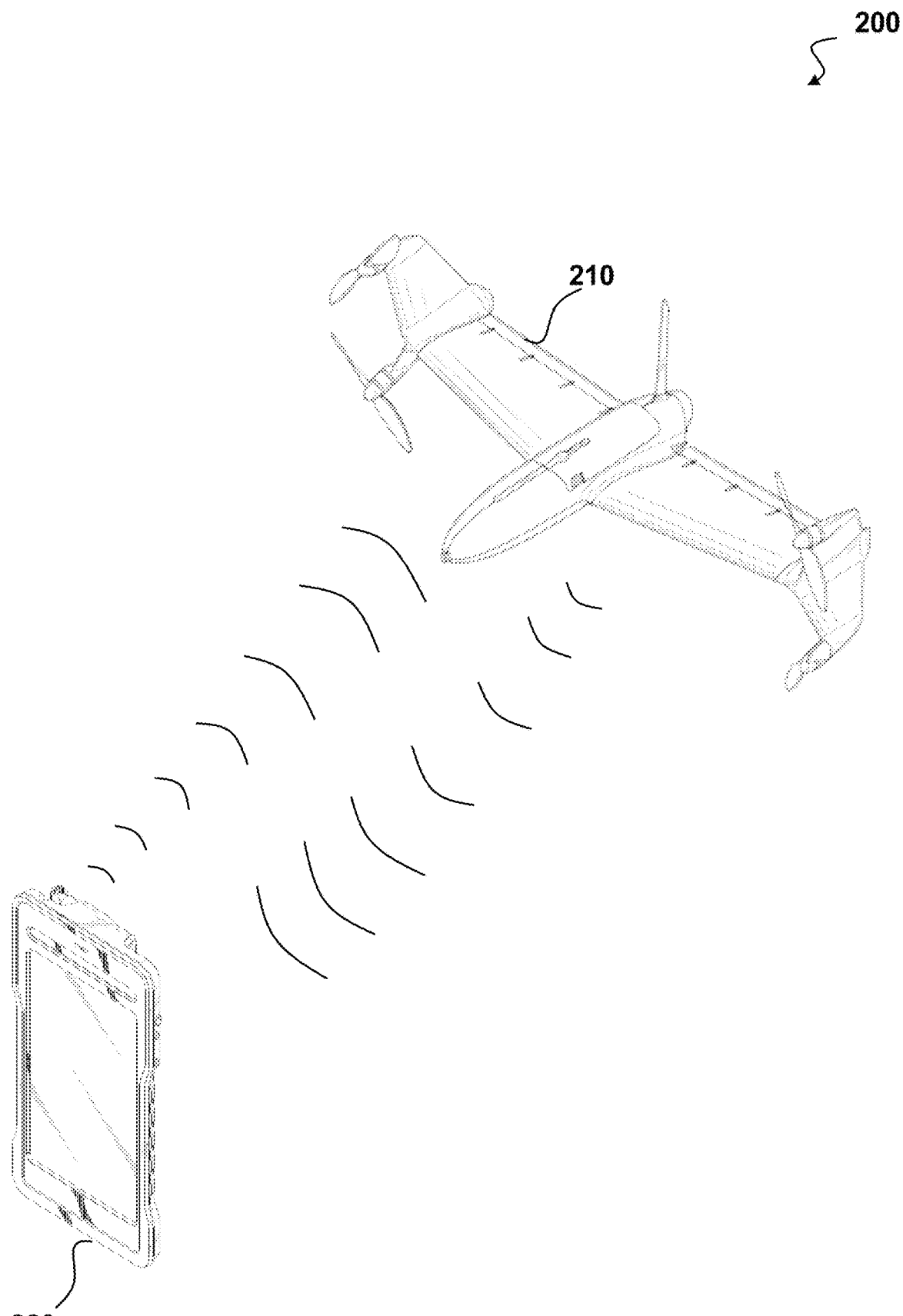
FIG. 2 depicts an air vehicle system having an air vehicle controlled by a ground control station.

FIG. 2 depicts an air vehicle system 200 having an air vehicle 210 controlled by a ground control station 220. The air vehicle 200 is shown in FIG. 2 in a horizontal orientation, such as it would be positioned during forward flight. The ground control station 220 can operate the air vehicle 200 motors through control surfaces via an on-board control system. Operation of the motors can apply to both forces and torque to the air vehicle 200. In many embodiments, the ground control station 220 may communicate with the air vehicle 210 to initiate a takeoff routine.

Figure 3:
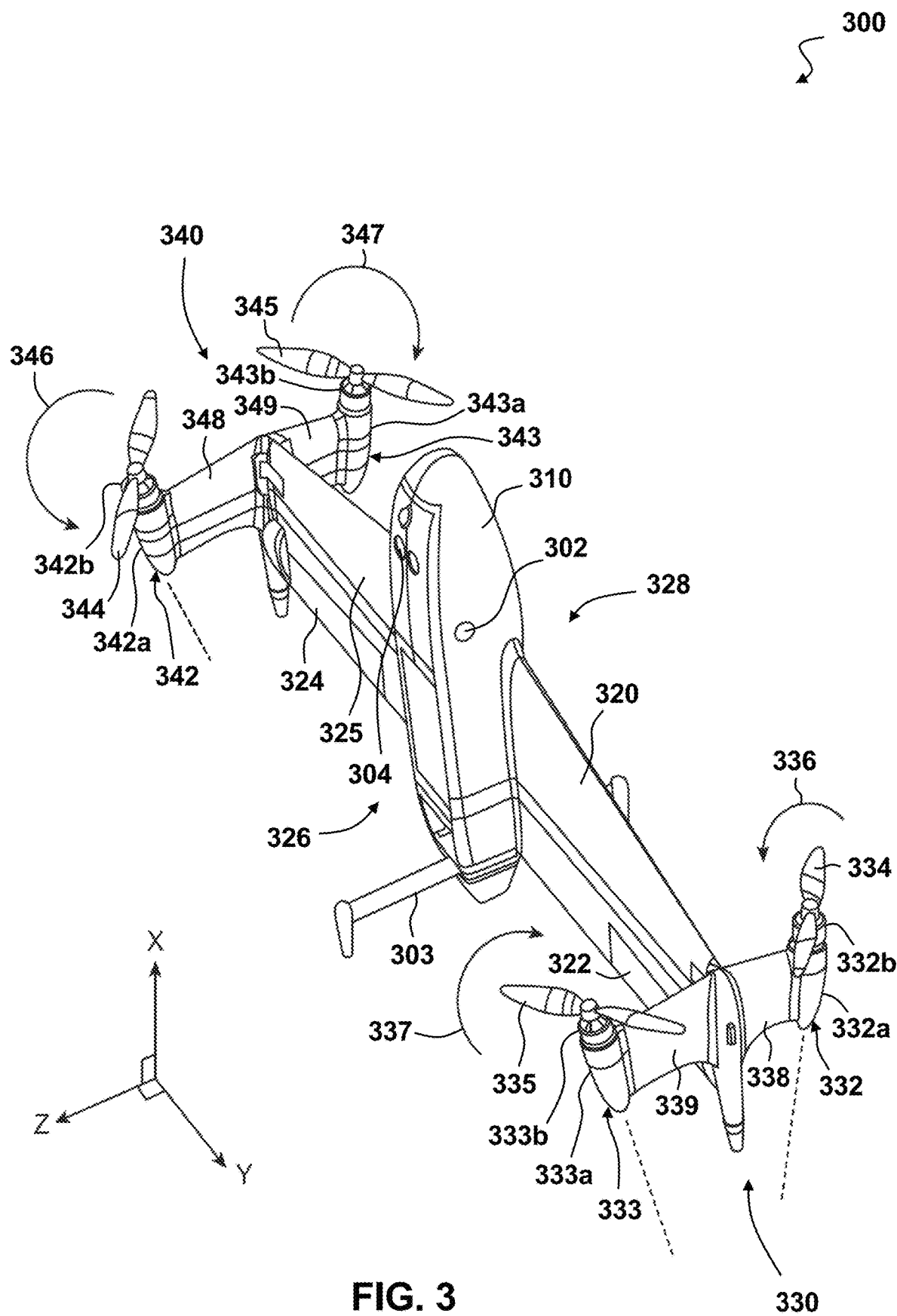
FIG. 3 depicts a perspective view of an embodiment of a vertical take-off and landing aerial vehicle.

FIG. 3 depicts a perspective view of an embodiment of a vertical take-off and landing aerial vehicle 300. The aerial vehicle 300 may be capable of vertical take-off and landing, hovering, vertical flight, maneuvering in a vertical orientation, transitioning between vertical and horizontal flight, and maneuvering in a horizontal orientation during forward flight. The aerial vehicle 300 may be controlled by an on-board control system that adjusts thrust to each of the motors 332b, 333b, 342b, 343b and control surfaces 322, 324. The on-board control system may include a processor having addressable memory and may apply differential thrust of the motors 332b, 333b, 342b, 343b to apply both forces and torque to the aerial vehicle 300.

The aerial vehicle 300 includes a fuselage 310 and a wing 320 extending from both sides of the fuselage 310. The wing 320 may include control surfaces 322, 324 positioned on either side of the fuselage 310. In some embodiments, the wing 320 may not include any control surfaces to reduce weight and complexity. A top side or first side 328 of the wing 320 may be oriented upwards relative to the ground during horizontal flight. A bottom side or second side 326 of the wing 320 may be oriented downwards relative to the ground during horizontal flight. The wing 320 is positioned in and/or about a wing plane 325. The wing plane 325 may be parallel to an x-y plane defined by the x-y-z coordinate system as shown in FIG. 3, where the x-direction is towards a longitudinal axis of aerial vehicle 300 and the y-direction is towards a direction out along the wing 320. The wing 320 may generally lie and/or align to the wing plane 325. In some embodiments, the wing 320 may define or otherwise have a planform of the wing that defines a plane that the wing is positioned at least symmetrically about.

One or more sensors 304 may be disposed in the fuselage 310 of the aerial vehicle 300 on the second side 326 to capture data during horizontal forward flight. The sensor 304 may be a camera, lidar, or other sensors, and any images captured during flight of the aerial vehicle 300 may be stored and/or transmitted to an external device. The sensor 304 may be fixed or pivotable relative to the fuselage 310 of the aerial vehicle 300. In some embodiments, the sensors 304 may be swapped based on the needs of a mission, such as replacing a LIDAR with an infrared camera for nighttime flights. In a number of embodiments, the sensors 304 may be capable of acquiring data that allows for a three-hundred-sixty-degree view of the surroundings of the aerial vehicle 300.

The aerial vehicle 300 is depicted in a vertical orientation, as it would be positioned on the ground prior to take-off or after landing. Landing gear 303 may maintain the aerial vehicle 300 in this vertical orientation. In some embodiments, the landing gear 303 may act as a vertical stabilizer during horizontal forward flight of the aerial vehicle 300.

A first motor assembly 330 is disposed at a first end or tip of the wing 320 distal from the fuselage 310. The first motor assembly 330 includes a pair of motor pods 332, 333 including pod structures 332a, 333a and motors 332b, 333b; winglets 338, 339; and propellers 334, 335. A top port motor pod 332 may include a top port pod structure 332a supporting a top port motor 332b. A rotor or propeller 334 may be driven by the top port motor 332b to provide thrust for the aerial vehicle 300. The top port motor pod 332 may be disposed on the first side 328 of the wing 320 and may be separated from the first end of the wing 320 by a spacer or winglet 338. The motor 332b applies a moment or torque on the propeller 334 to rotate it and in so doing applies an opposing moment or torque 336 on the aerial vehicle 300. The opposing moment 336 acts to rotate or urge the aerial vehicle 300 to rotate about its center of mass 302. The moment 336 may change in conjunction with the speed of the propeller 334 and as the propeller 334 is accelerated or decelerated. The propeller 334 may be a fixed or variable pitch propeller.

The angling of the axis of rotation of the motor 332b and propeller 334 from the vertical, but aligned with the plane of the winglet 338 and/or with a plane perpendicular to the wing plane 325, provides for a component of the thrust generated by the operation of the propeller 334 to be vertical, in the x-direction, and another component of the thrust to be perpendicular to the wing 320, in the negative z-direction. This perpendicular component of the thrust may act upon a moment arm along the wing 320 to the center of mass 302 of the aerial vehicle 300 to impart a moment to cause, or at least urge, the aerial vehicle 300 to rotate about its vertical axis when the aerial vehicle 300 is in vertical flight, and to roll about the horizontal axis when the aircraft is in forward horizontal flight. In some embodiments, this component of thrust perpendicular to the wing 320, or the negative z-direction, may also be applied in a position at the propeller 334 that is displaced a distance from the center of mass 302 of the aircraft 300, such as to apply a moment to the aerial vehicle 300 to cause, or at least urge, the aerial vehicle 300 to pitch about its center of mass 302. This pitching may cause, or at least facilitate, the transition of aerial vehicle 300 from vertical flight to horizontal flight, and from horizontal flight to vertical flight.

A bottom port motor pod 333 may include a bottom port pod structure 333a supporting a bottom port motor 333b. The bottom port motor 333b is disposed on the second side 326 of the wing 320 opposing the top port motor 332b. A rotor or propeller 335 may be driven by the bottom port motor 333b to provide thrust for the aerial vehicle 300. The bottom port motor pod 333 may be disposed on the second side 326 of the wing 320 and may be separated from the first end of the wing 320 by a spacer or winglet 339.

The motor 333b applies a moment or torque on the propeller 335 to rotate it and in so doing applies an opposing moment or torque 337 on the aerial vehicle 300. The opposing moment 337 acts to rotate or urge the aerial vehicle 300 to rotate about its center of mass 302. The moment 337 may change in conjunction with the speed of the propeller 335 and as the propeller 335 is accelerated or decelerated. The propeller 335 may be a fixed or variable pitch propeller.

The motor pod 333, the motor 333b, and the propeller 335 may all be aligned to be angled down in the direction of the second side 326 of the wing 320, down from the x-y plane in the z-direction, from the vertical while being within a plane of the winglet 339, such that any force, and force components thereof, generated by the propeller 335 shall align, and/or be within, the plane of the winglet 339, such that lateral forces to the plane of the winglet 339 are minimized or not generated. The alignment of the motor 333b and the propeller 335 may be a co-axial alignment of their respective axes of rotation.

The angle that the motor 333b and propeller 335 axes are from the vertical, x-direction may vary from 5 to 35 degrees. In one embodiment, the angle may be about 10 degrees from vertical. The angle of the motor 333b and propeller 335 axes may be determined by the desired lateral force component needed to provide sufficient yaw in vertical flight and/or sufficient roll in horizontal flight, such as that necessary to overcome wind effects on the wing 320. This angle may be minimized to maximize the vertical thrust component for vertical flight and the forward thrust component for horizontal flight.

The angling of the axis of rotation of the motor 333b and propeller 335 from the vertical, but aligned with the plane of the winglet 339 and/or with the plane perpendicular to the wing plane 325, provides for a component of the thrust generated by the operation of the propeller 335 to be vertical, in the x-direction, and another component of the thrust to be perpendicular to the wing 320, in the z-direction.

This perpendicular component of the thrust may act upon a moment arm along the wing 320 to the center of mass 302 of the aerial vehicle 300 to impart a moment to cause, or at least urge, the aerial vehicle 300 to rotate about its vertical axis when the aerial vehicle 300 is in vertical flight, and to roll about the horizontal axis when the aircraft is in forward horizontal flight. In some embodiments, this component of thrust perpendicular to the wing 320, or the z-direction, may also be applied in a position at the propeller 335 that is displaced a distance from the center of mass 302 of the aircraft 300, such as to apply a moment to the aerial vehicle 300 to cause, or at least urge, the aerial vehicle 300 to pitch about its center of mass 302. This pitching may cause, or at least facilitate, the transition of aerial vehicle 300 from vertical flight to horizontal flight, and from horizontal flight to vertical flight.

A second motor assembly 340 is disposed at a second end or tip of the wing 320 distal from the fuselage 310 and distal from the first motor assembly 330. The second motor assembly 340 includes a pair of motor pods 342, 343 including pod structures 342a, 343a and motors 342b, 343b; winglets 348, 349; and propellers 344, 345. A top starboard motor pod 343 may include a top starboard pod structure 343a supporting a top starboard motor 343b. A rotor or propeller 345 may be driven by the top starboard motor 343b to provide thrust for the aerial vehicle 300. The top starboard motor pod 343 may be disposed on the first side 328 of the wing 320 and may be separated from the second end of the wing 320 by a spacer or winglet 349. The motor 343b applies a moment or torque on the propeller 345 to rotate it and in so doing applies an opposing moment or torque 347 on the aerial vehicle 300. The opposing moment 347 acts to rotate or urge the aerial vehicle 300 to rotate about its center of mass 302. The moment 347 may change in conjunction with the speed of the propeller 345 and as the propeller 345 is accelerated or decelerated. The propeller 345 may be a fixed or variable pitch propeller.

The motor pod 343, the motor 343b, and the propeller 345 may all be aligned to be angled up in the direction of the first side 328 of the wing 320, up from the x-y plane in the negative z-direction, from the vertical while being within a plane of the winglet 349, such that any force, and force components thereof, generated by the propeller 347 shall align, and/or be within, the plane of the winglet 349, such that lateral forces to the plane of the winglet 349 are minimized or not generated. The alignment of the motor 343b and the propeller 345 may be a co-axial alignment of their respective axes of rotation.

The angle that the motor 343b and propeller 345 axes are from the vertical, x-direction may vary from 5 to 35 degrees. In one embodiment, the angle may be about 10 degrees from vertical. The angle of the motor 343b and propeller 345 axes may be determined by the desired lateral force component needed to provide sufficient yaw in vertical flight and/or sufficient roll in horizontal flight, such as that necessary to overcome wind effects on the wing 320. This angle may be minimized to maximize the vertical thrust component for vertical flight and the forward thrust component for horizontal flight.

The angling of the axis of rotation of the motor 343b and propeller 345 from the vertical, but aligned with the plane of the winglet 349 and/or with the plane perpendicular to the wing plane 325, provides for a component of the thrust generated by the operation of the propeller 345 to be vertical, in the x-direction, and another component of the thrust to be perpendicular to the wing 320, in the negative z-direction. This perpendicular component of the thrust may act upon a moment arm along the wing 320 to the center of mass 302 of the aerial vehicle 300 to impart a moment to cause, or at least urge, the aerial vehicle 300 to rotate about its vertical axis when the aerial vehicle 300 is in vertical flight, and to roll about the horizontal axis when the aircraft is in forward horizontal flight. In some embodiments, this component of thrust perpendicular to the wing 320, or the negative z-direction, may also be applied in a position at the propeller 345 that is displaced a distance from the center of mass 302 of the aircraft 300, such as to apply a moment to the aerial vehicle 300 to cause, or at least urge, the aerial vehicle 300 to pitch about its center of mass 302. This pitching may cause, or at least facilitate, the transition of aerial vehicle 300 from vertical flight to horizontal flight, and from horizontal flight to vertical flight.

A bottom starboard motor pod 342 may include a bottom starboard pod structure 342a supporting a bottom starboard motor 342b. The bottom starboard motor 342b is disposed on the second side 326 of the wing 320 opposing the top starboard motor 343b. A rotor or propeller 344 may be driven by the bottom starboard motor 342b to provide thrust for the aerial vehicle 300. The bottom starboard motor pod 342 may be disposed on the second side 326 of the wing 320 and may be separated from the second end of the wing 320 by a spacer or winglet 348.

The motor pod 342, the motor 342b, and the propeller 344 may all be aligned to be angled down in the direction of the second side 326 of the wing 320, down from the x-y plane in the z-direction, from the vertical while being within a plane of the winglet 348, such that any force, and force components thereof, generated by the propeller 344 shall align, and/or be within, the plane of the winglet 348, such that lateral forces to the plane of the winglet 348 are minimized or not generated. The alignment of the motor 342b and the propeller 344 may be a co-axial alignment of their respective axes of rotation.

The angle that the motor 342b and propeller 344 axes are from the vertical, x-direction may vary from 5 to 35 degrees. In one embodiment, the angle may be about 10 degrees from vertical. The angle of the motor 342b and propeller 344 axes may be determined by the desired lateral force component needed to provide sufficient yaw in vertical flight and/or sufficient roll in horizontal flight, such as that necessary to overcome wind effects on the wing 320. This angle may be minimized to maximize the vertical thrust component for vertical flight and the forward thrust component for horizontal flight.

The motor 342b applies a moment or torque on the propeller 344 to rotate it and in so doing applies an opposing moment or torque 346 on the aerial vehicle 300. The opposing moment 346 acts to rotate or urge the aerial vehicle 300 to rotate about its center of mass 302. The moment 346 may change in conjunction with the speed of the propeller 344 and as the propeller 344 is accelerated or decelerated. The propeller 344 may be a fixed or variable pitch propeller.

The angling of the axis of rotation of the motor 342b and propeller 344 from the vertical, but aligned with the plane of the winglet 348 and/or with the plane perpendicular to the wing plane 325, provides for a component of the thrust generated by the operation of the propeller 344 to be vertical, in the x-direction, and another component of the thrust to be perpendicular to the wing 320, in the z-direction. This perpendicular component of the thrust may act upon a moment arm along the wing 320 to the center of mass 302 of the aerial vehicle 300 to impart a moment to cause, or at least urge, the aerial vehicle 300 to rotate about its vertical axis when the aerial vehicle 300 is in vertical flight, and to roll about the horizontal axis when the aircraft is in forward horizontal flight. In some embodiments, this component of thrust perpendicular to the wing 320, or the z-direction, may also be applied in a position at the propeller 344 that is displaced a distance from the center of mass 302 of the aircraft 300, such as to apply a moment to the aerial vehicle 300 to cause, or at least urge, the aerial vehicle 300 to pitch about its center of mass 302. This pitching may cause, or at least facilitate, the transition of aerial vehicle 300 from vertical flight to horizontal flight, and from horizontal flight to vertical flight.

The motors 332b, 333b, 342b, 343b operate such that variations in the thrust or rotation for fixed pitched rotors, and resulting torque or moment of pairs of the motors can create a resulting moment applied to the aerial vehicle 300 to move it in a controlled manner. Because of the angling off of the aircraft longitudinal centerline, vertical in hover and horizontal in forward horizontal flight, of each of the motors 332b, 333b, 342b, 343b, in addition to the moment imparted by the differential of the operation of the motors 332b, 333b, 342b, 343b a complementary force component is generated and applied to the aerial vehicle 300 to move it in the same manner.

Increasing thrust to the top two motors 332b, 343b, and decreasing thrust to the bottom two motors 333b, 342b in horizontal flight will cause the aerial vehicle 300 to pitch down. Decreasing thrust to the top two motors 332b, 343b, and increasing thrust to bottom two motors 333b, 342b in horizontal flight will cause the aerial vehicle 300 to pitch up. A differential between the thrust of the top two motors 332b, 343b and the bottom two motors 333b, 342b may be used to control the pitch of the aerial vehicle 300 during horizontal flight. In some embodiments, control surfaces 322, 324 on the wing 320 may also be used to supplement pitch control of the aerial vehicle 300. The separation of the top and bottom motors by their respective winglets is needed to create the pitch moment of the aerial vehicle 300.

Increasing thrust to the top port motor 332b and bottom starboard motor 342b, and decreasing thrust to the top starboard motor 343b and bottom port motor 333b in horizontal flight will cause the aerial vehicle 300 to roll clockwise relative to a rear view of the aerial vehicle 300. Decreasing thrust to top port motor 332b and bottom starboard motor 342b, and increasing thrust to the top starboard motor 343b and bottom port motor 333b in horizontal flight will cause the aerial vehicle 300 to roll counter-clockwise relative to a rear view of the aerial vehicle 300. A differential between the thrust of the top port and bottom starboard motors and the top starboard and bottom port motors may be used to control roll of the aerial vehicle 300 during horizontal flight. In some embodiments, control surfaces 322, 324 on the wing 320 may also be used to supplement roll control of the aerial vehicle 300.

Increasing thrust to both port motors 332b, 333b and decreasing thrust to both starboard motors 342b, 343b in horizontal flight will cause the aerial vehicle 300 to yaw towards starboard. Decreasing thrust to both port motors 332b, 333b and increasing thrust to both starboard motors 342b, 343b in horizontal flight will cause the aerial vehicle 300 to yaw towards port. A differential between the thrust of the top and bottom starboard motors 342b, 343b and the top and bottom port motors 332b, 333b may be used to control yaw of the aerial vehicle 300 during horizontal flight.

Figure 4:
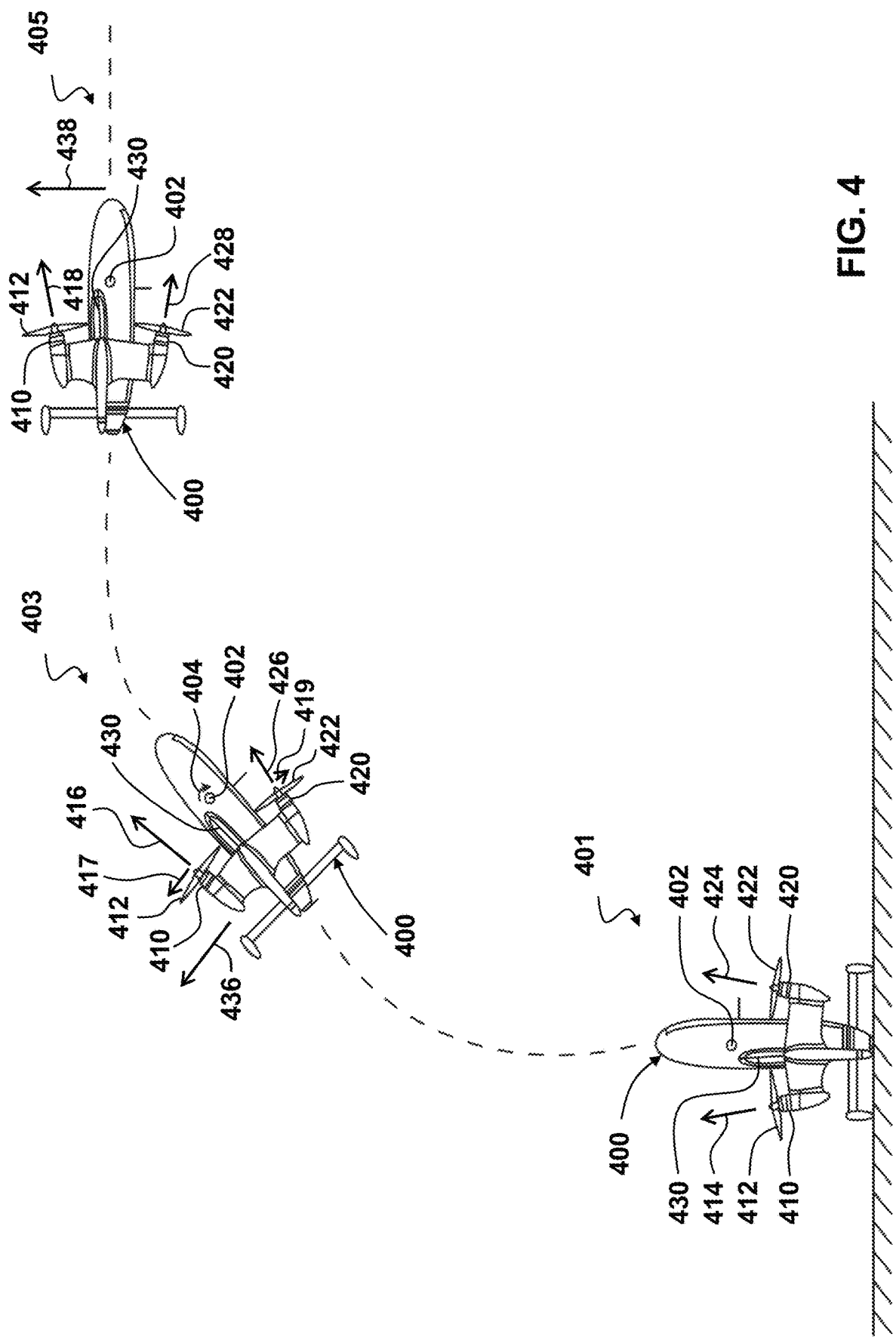
FIG. 4 depicts an aerial vehicle transitioning from vertical flight to horizontal flight by varying the thrust produced by its motors.

FIG. 4 depicts a aerial vehicle 400 transitioning from vertical flight to horizontal flight by varying the thrust produced by its motors. The aerial vehicle 400 is in a first position 401 on the ground ready for vertical take-off. A top motor 410 connected to a top propeller 412 is angled outward from vertical and away from a wing 430. A bottom motor 420 connected to a bottom propeller 422 is angled outward from vertical and away from the wing 430. The top motor 410 and bottom motor 420 are positioned at an end of the wing 430 of the aerial vehicle 400 and may be separated from the wing 430 by a winglet or spacer. Additional top and bottom motors and corresponding propellers may be present behind the top motor 410 and bottom motor 420 and positioned on the opposing end of the wing 430, such as shown in FIG. 3.

An on-board controller having a processor and addressable memory may send a signal to the motors to produce thrust needed for vertical take-off and subsequent adjustments to thrust during flight. Flight control may be anonymous, pre-programmed, and/or controlled by an external user at a ground control system. Top motors 410 create top thrust 414, and bottom motors create bottom thrust 424. During vertical take-off, the top thrust 414 and bottom thrust 424 may be substantially equal. The top thrust 414 and the bottom thrust 424 are depicted as angled based on the angles of the respective motors 410, 420 and propellers 412, 422 to have both a vertical and a lateral component.

The aerial vehicle 400 is in a second position 403 transitioning from vertical flight to horizontal flight. The aerial vehicle 400 pitches forward by increasing a top thrust 416 produced by the top motor 410 and decreasing a bottom thrust 426 produced by the bottom motor 420. This thrust differential produces a net moment 404 about a center of mass 402 of the aerial vehicle 400, which causes the aerial vehicle 400 to pitch forward. The component of the top thrust 416 in the lateral direction 417 is greater than the opposing lateral thrust 419 from the bottom thrust 426, and the lateral thrust 417 adds to the lift 436 created by the wing 430.

The aerial vehicle 400 is in a third position 405 in forward horizontal flight. The wing lift 438 is carrying the weight of the aerial vehicle 400. As the top thrust 418 and bottom thrust 428 are adjusted, the aerial vehicle 400 may be pitched up or down. Adjusting thrust to the motors on the opposing end of the wing 430 of the aerial vehicle 400 may allow the aerial vehicle 400 to be yawed left or right by differential thrust between the right and left sides.

In certain embodiments, there are separate controllers being utilized by the aerial vehicle 400 between the first position 401 and the third position 405. In many embodiments, the ailerons and differential motors of the aerial vehicle 400 are utilized in the third position 405. In further embodiments, the ailerons control the roll and pitch of the aerial vehicle 400 while the differential motors control the yaw of the aerial vehicle 400 in the third position 405. In additional embodiments, only the differential motors are utilized for control of the aerial vehicle 400 in the first position 401. In still additional embodiments, control of the aerial vehicle 400 is transitioned from a first set of controls in the first position 401 to a second set of controls in the third position 405 during the transition of the second position 403. In still further embodiments, the transition between controls of the first position 401 and the third position 405 is accomplished via a fading method. In still yet further embodiments, a series of health checks are performed during the second position 403 to evaluate the transition. By way of example, but not limitation, when the controls of the third position are not found or fail, the transition may be cancelled and/or the controls from the first position 401 may be utilized.

Figure 5:
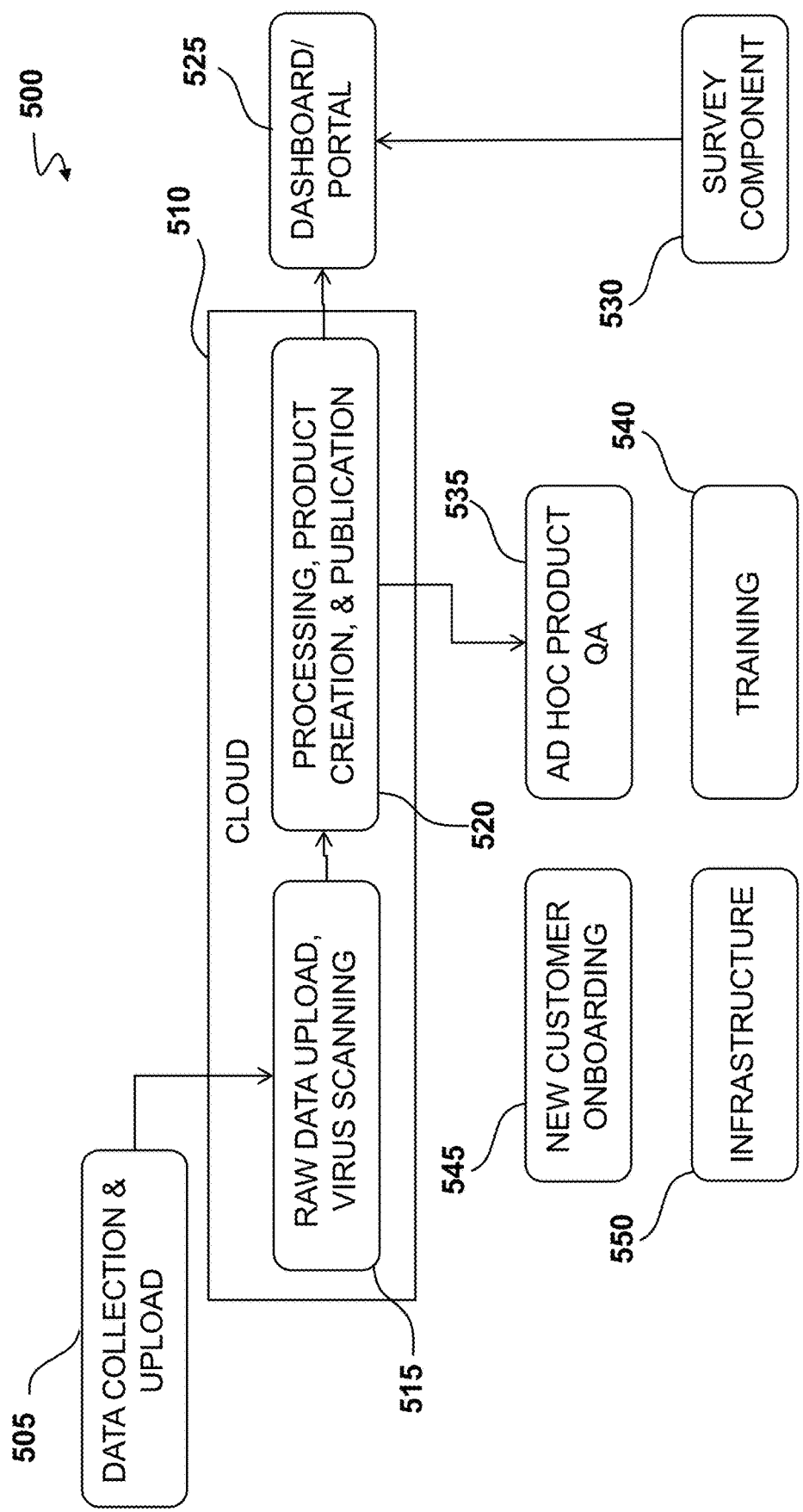
FIG. 5 depicts a cloud-based image management workflow for aerial vehicle captured images.

FIG. 5 depicts a cloud-based image management workflow 500 for aerial vehicle captured images. In many embodiments, the workflow 500 collects data 505 from an aerial vehicle. In a number of embodiments, the aerial vehicle may be a vertical take-off and landing (VTOL) aerial vehicle. In numerous embodiments, the collected data may be in the form of multi-spectral images of a pre-defined ground region. In certain embodiments, the pre-defined ground region may be selected by a user. In further embodiments, the collected image data is uploaded 505 to a cloud-based service 510. The cloud-based service 510 may scan the uploaded data for viruses 515. In additional embodiments, the cloud-based service 510 may process the collected data and publish it for future consumption 520. In still additional embodiments, the published product creation 520 may be accessed through a software dashboard and/or portal 525. In certain embodiments, the dashboard and/or portal 525 may be accessed through a personal computer, smartphone, tablet, or the like. In still yet additional embodiments, the dashboard and/or portal 525 may interact with or be accessed by a computing device component including, but not limited to, a survey component 530.

In further embodiments, the dashboard 525 may allow for the management of all of the imagery data associated with the user account. In still further embodiments, the dashboard 525 may allow the user account to manage land to be imaged by the aerial vehicle including, but not limited to, adding locations to be imaged, adding season dates, adding crop types, adding user-generated tags, adding filters to narrow down displayed imagery data, and/or adding user-generated notes onto the imagery. In yet still further embodiments, the dashboard 525 may utilize the stored imagery data to create a map of a user-determined location. In certain further embodiments, the imagery may be obtained from commercial satellite image vendors, such as ESRI of Redlands, California. In certain other embodiments, the imagery data may be captured image data from the user aerial vehicle.

In a number of embodiments, the imagery data of the cloud-based image management system 500 may be utilized by providing additional analytics such as canopy and/or anomaly coverage. Imagery data may provide canopy coverage data within a determined area. A low-altitude aerial vehicle can capture image data at a much higher resolution than other airplane or satellite methods, providing a higher resolution of data. In many embodiments, the higher resolution of captured image data may allow for a more robust anomaly detection system. By way of example, and not limitation, a user and/or farmer may be notified earlier of an anomaly in their plant field based on the increased resolution of the captured image data that indicates a discoloration or other anomaly. In further embodiments, a rating can be generated from the captured image data that relates to the canopy and/or anomaly levels. By way of example and not limitation, a rating of 95 may be considered acceptable (green), a rating of 90-95 may be considered low risk (yellow), and a generated rating below 90 may be considered to require immediate attention (red). In still further embodiments, the cloud-based image management system 500 may generate a warning to the user based on the generated ratings. In yet further embodiments, the user may determine when warnings are generated and how they are communicated to the user. By way of example and not limitation, a user may be sent a warning when a determined area contains an anomaly level of five percent and can be sent an urgent message when the anomaly level goes above eleven percent. In still additional embodiments, the ground sample distance (GSD) of the aerial vehicle may be much more accurate relative to airplane images and/or satellite images because of the lower altitude of the sensing devices when the images are captured. In still yet additional embodiments, the increased GSD of the aerial vehicle can yield an approximately accurate resolution down to within about twelve inches.

In a variety of embodiments, the cloud-based image management system 500 may include pre-captured images of a determined area acquired prior to an initial image capture. In certain embodiments, these images may be commercially available satellite or aerial photographs. The cloud-based image management system 500 may associate the pre-captured images with a respective longitude and latitude. When an aerial vehicle captures new image data of a determined area, the system 500 may co-register the newly captured image data with the pre-captured images. In a number of embodiments, because of the increased GSD resolution, the correlated images may yield more accurate overall image data compared to the pre-captured images. In certain embodiments, each new image capture of a determined area may allow the cloud-based image management system 500 to further co-register images to determine a more accurate representation of the determined area. In still additional embodiments, external factors including, but not limited to, weather conditions, and/or image capture time of day may be factored into the colocation process.

In many embodiments, the image data captured by the aerial vehicle may include a series of multi-spectral images. In numerous embodiments, these images may represent, but are not limited to, red, green, blue, infra-red, and ultra-violet spectrums. In a number of embodiments, the multi-spectral cameras of the aerial vehicle may have a resolution of at least 18 megapixels. In additional embodiments, the captured image data may be utilized to generate a normalized difference vegetation index (NDVI) profile of the determined area. NDVI profiles may be generated based on the plant types of a given determined area and may be adjusted based on weather conditions and/or health level information desired. In further embodiments, the cloud-based image management system 500 may provide the user with a variety of multi-band images based upon the desired application. In still further embodiments, the user may be provided a tool to select between any of the captured image data spectrum for viewing. In yet still further embodiments, the displayed captured image data may be a mixture of different spectrum images based upon input by the user of what image spectrums to display. In further additional embodiments, the images may be in the JPEG and/or GeoTIFF file format.

In multiple embodiments, the resulting image data generated by the user may be exported from the cloud-based image management system 500 to a variety of devices including, but not limited to, a personal computer, a mobile computing device and/or another user account in the image management software ecosystem.

Additionally, in certain embodiments, reports may be generated based upon the captured image data. In many embodiments, generated reports may include, but are not limited to, displaying a graphical layout of the determined area that is being reported on, graphing out flights and canopy percentages, changes occurring between multiple flights by the aerial vehicle, weather reports, yield information, season dates, latitude/longitude points, and/or sorting by: alert status; image capture date; and/or vegetation type within the determined area. In further embodiments, generated reports may be sent out to other users in the cloud-based image management account ecosystem. In still further embodiments, the generation report data may be exported in a format that can be utilized in a farm management system.

In still yet further embodiments, the farm management system can utilize the generate reports to determine specific programs of crop spraying to minimize spray usage. In further additional embodiments, tractors with variable output technology can utilize the specific spraying programs to increase the efficiency of fertilizer and/or weed killer usage. In some embodiments, the cloud-based image management system 500 may include a new customer onboarding component 545, an ad hoc product quality assurance (QA) component 535, a training component 540, and/or an infrastructure component 550.

Figure 6:
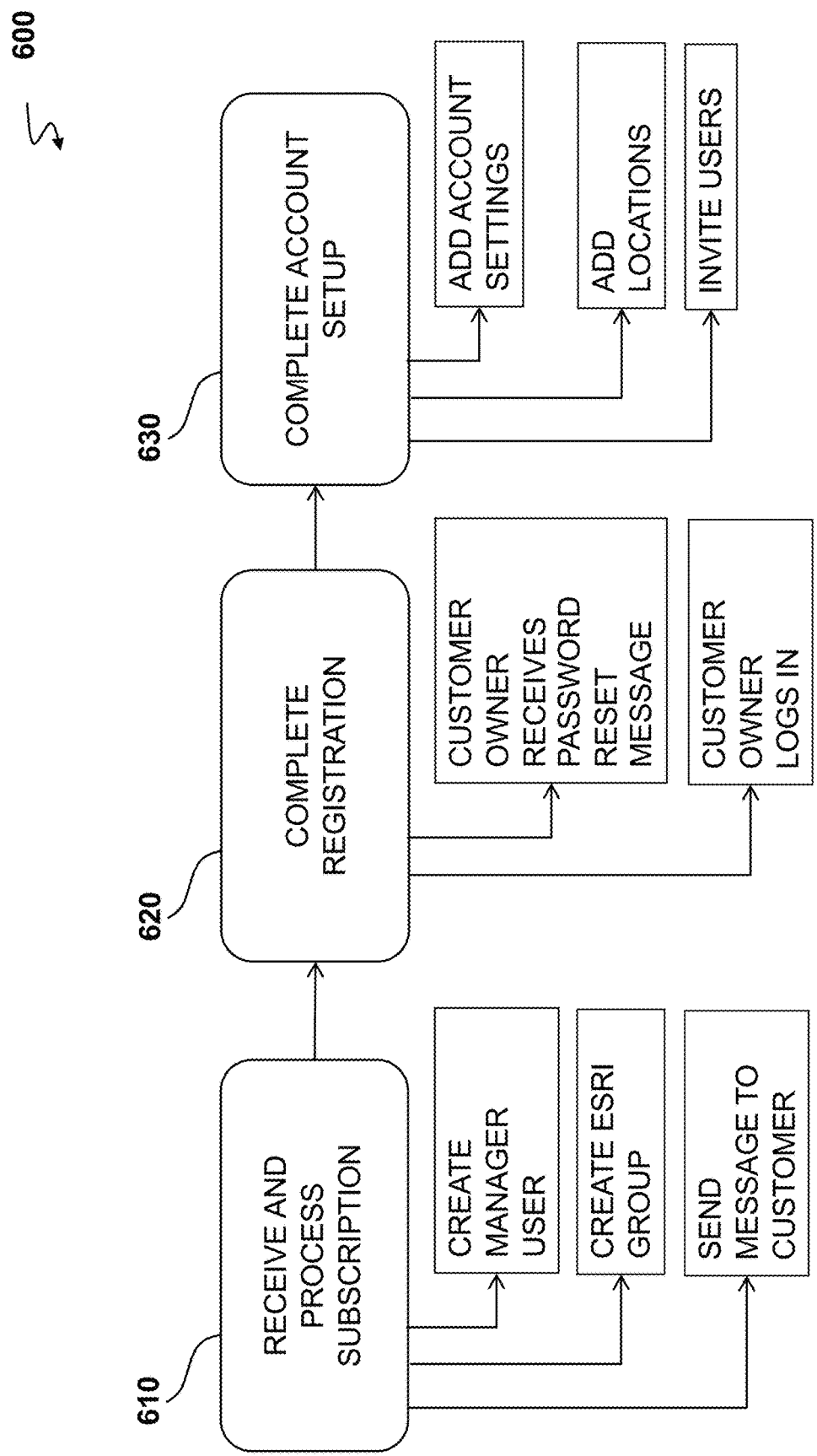
FIG. 6 depicts a process for setting up new customers in the cloud-based image management system.

FIG. 6 depicts a process for setting up new customers in the cloud-based image management system. In many embodiments, the process 600 receives 610 a subscription and processes the subscription to create a new managing user. In a number of embodiments, a set of image data may be associated with the new managing user. In further embodiments, the associated data may be a set of images from ESRI. In still further embodiments, the associated data may be determined from the location of the new managing user to minimize the amount of associated image data required. The new managing user may then complete 620 the registration process. In further embodiments, the registration is completed upon the new managing user receiving a password reset message and then having the new user log into the image management system 600. In additional embodiments, the new managing user account setup can be completed 630 by adding additional account settings, locations, and/or inviting users. In still additional embodiments, the managing user may add up to two other users to the account.

Figure 7:
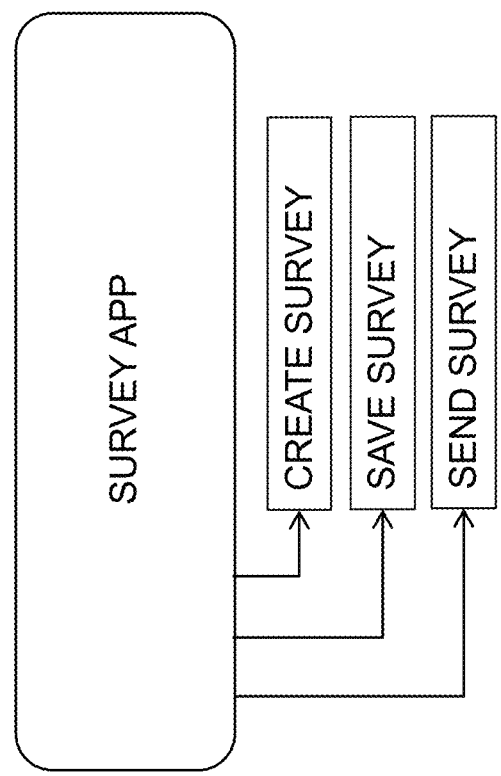
FIG. 7 depicts an overview of a survey app system in accordance with an embodiment of the invention.

FIG. 7 depicts an overview of a survey app system 700 in accordance with an embodiment of the invention. In many embodiments, app 700 may allow users to ground truth the system data as well add user collected notes and images to the cloud-based images management system. In a number of embodiments, the mobile component may provide a method of creating surveys by users. In additional embodiments, the surveys created by users may be saved and/or sent to the cloud-based image management system.

Figure 8:
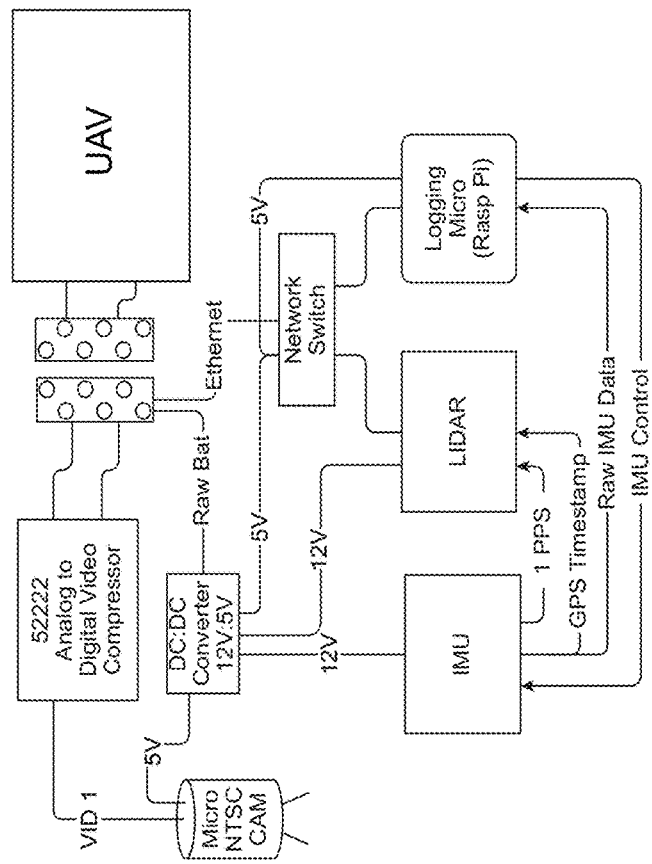
FIG. 8 depicts a LIDAR merger architecture, in accordance with an embodiment of the invention.

FIG. 8 depicts a LIDAR merger architecture, in accordance with an embodiment of the invention. In many embodiments, the LIDAR system may be in communication with an inertial measurement unit (IMU). In certain embodiments, that communication rate may be at approximately one pulse per second. In additional embodiments, the LIDAR is powered by an internal battery system. In still additional embodiments, the IMU communicates a GPS timestamp signal to the LIDAR component.

Figure 9:
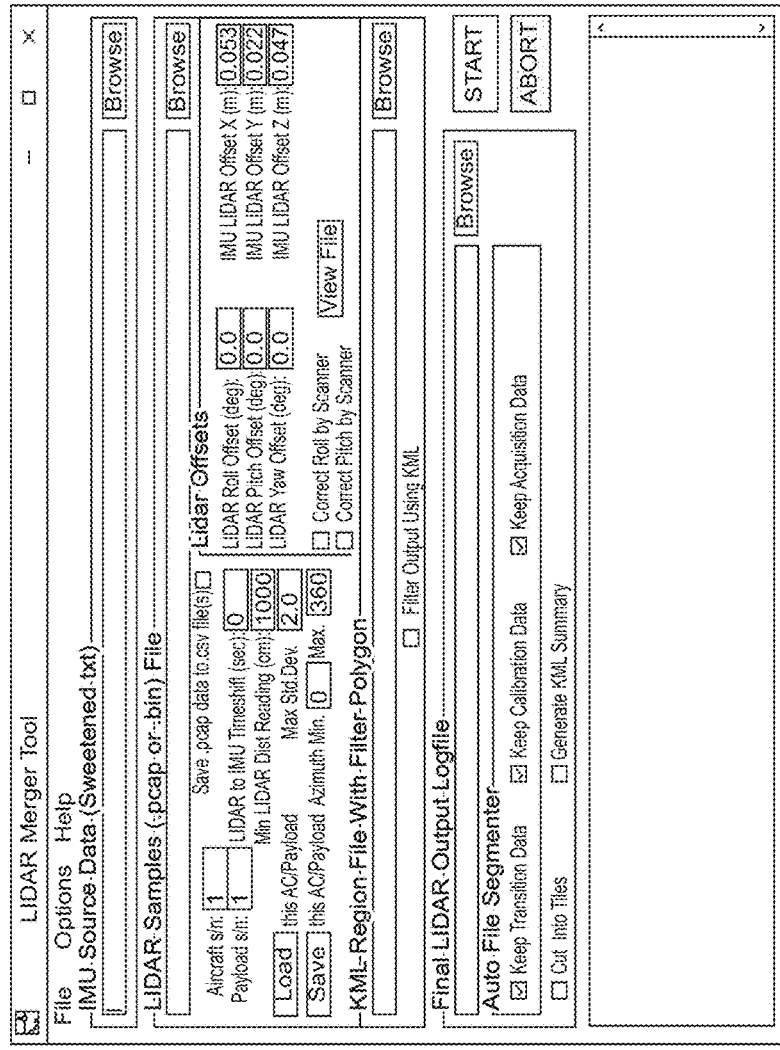
FIG. 9 depicts a screenshot of a LIDAR merger tool, in accordance with an embodiment of the invention.

FIG. 9 depicts a screenshot of a LIDAR merger tool, in accordance with an embodiment of the invention. In a number of embodiments, the LIDAR merger tool may be able to generate a final LIDAR output log file.

Figure 10:
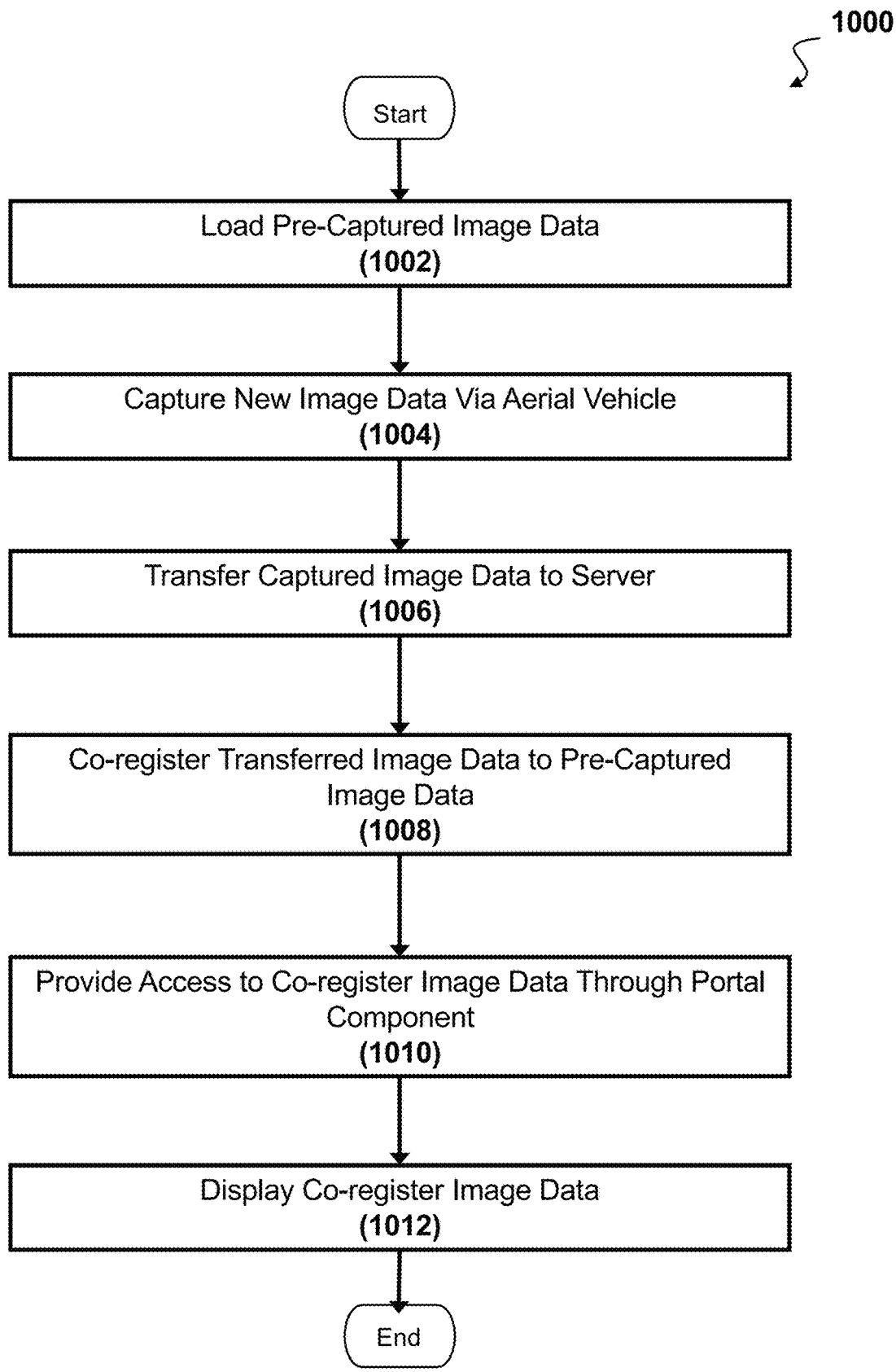
FIG. 10 depicts a process for displaying co-registered data generated from a cloud-based image management system, in accordance with an embodiment of the invention.

FIG. 10 depicts a process for displaying co-registered data generated from a cloud-based image management system, in accordance with an embodiment of the invention. The process 1000 may begin when at least one set of pre-captured image data is loaded into the cloud-based image management system (step 1002). In a number of embodiments, the pre-captured image data may be obtained from a third-party image supplier such as ESRI. In certain embodiments, when pre-captured image data is loaded into the system, new image data may be captured by an aerial vehicle (step 1004). The aerial vehicle may be a VTOL aerial vehicle or a VTOL UAV. In additional embodiments, captured image data can be transferred to a server (step 1006). In many embodiments, the image data upload may be transferred through the Internet to a cloud-based server that stores and processes the image management system software and data. In a variety of embodiments, the captured image data and the pre-captured image data may be co-registered with each other (step 1008). In still additional embodiments, the co-registered process increases the accuracy of the overall image data. In yet further embodiments, the process 1000 may provide access to the co-registered image data through a portal or dashboard component (step 1010). In still further embodiments, the portal or dashboard component may display the co-registered image data based upon the request of the user (step 1012).

Figure 11:
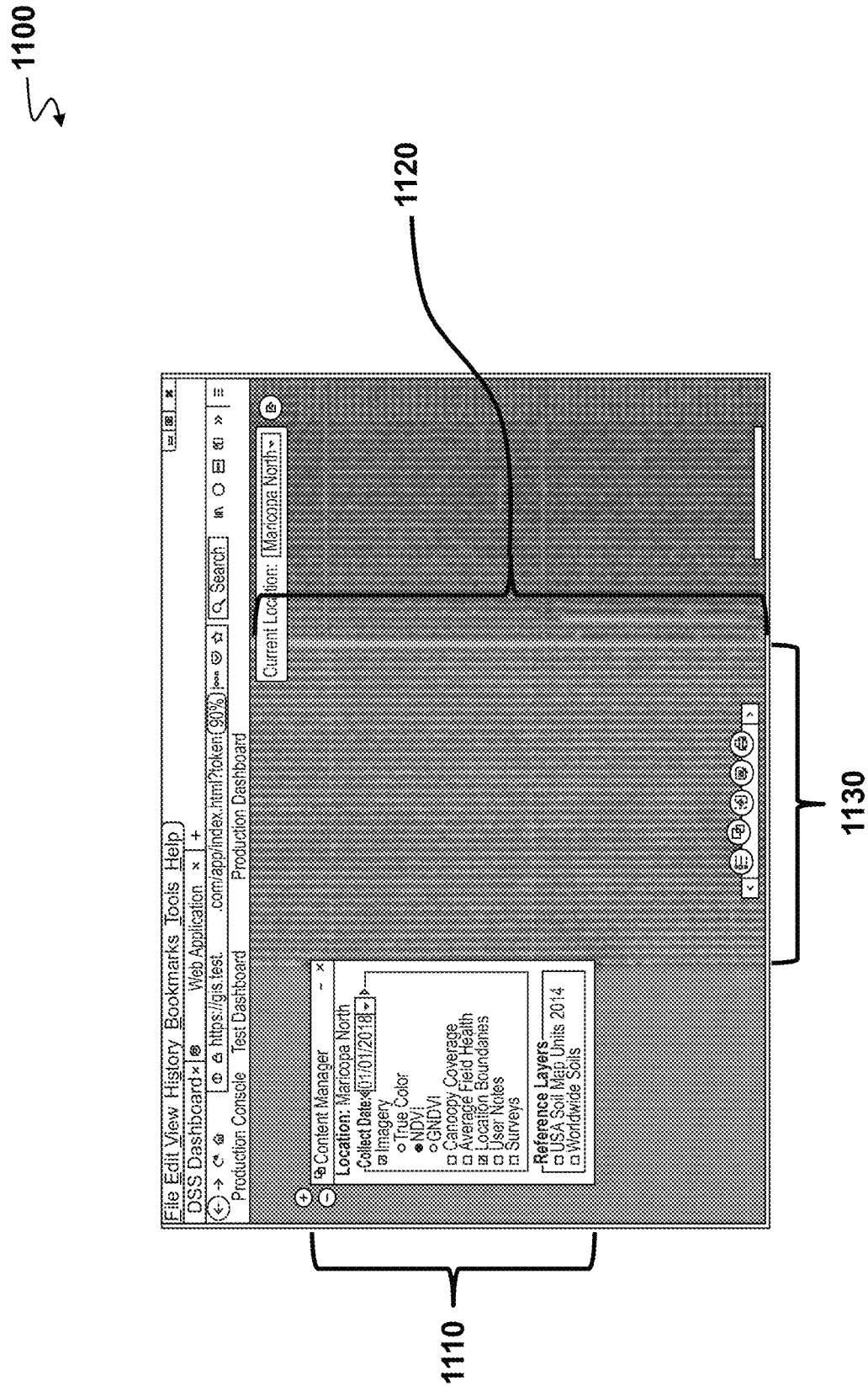
FIG. 11 depicts a screenshot of a cloud-based image management system Analytics Portal and content manager.

FIG. 11 depicts a screenshot of a cloud-based image management system Analytics Portal and content manager. The screenshot 1100 depicts an image of an aerial view of a land area. In a number of embodiments, the aerial view is of a section of land that is to be monitored by the user. In many embodiments, the Analytics Portal may allow for the selection of an area of land to be monitored and/or examined. By way of example, and not limitation, a user may select an area of land having an approximate height 1120 and width 1130. In further embodiments, the selected area of land may be highlighted, allowing for additional actions to be selected by the user. In still further embodiments, the Analytics Portal may provide a content manager 1100 that allows a user to select from a variety of different images that may comprise data of varying spectral wavelengths. In still yet further embodiments, the content manager 1100 may also allow a user to view images from past collection dates through the use of a selection tool such as, but not limited to, a drop-down menu. In still yet further embodiments, the content manager 1100 may allow for the selection of reference layers of information including, but not limited to, USA soil map units provided by the United States Geological Survey (USGS) from the Department of the Interior and/or other worldwide soil reference layers. In additional embodiments, the content manager 1100 may provide for the selection of a canopy coverage view that can indicate the canopy coverage of the selected ground area. In further additional embodiments, the content manager 1100 may also allow for the selection and viewing of other types of data including, but not limited to, average field health, location boundaries, user notes, and/or surveys.

Figure 12:
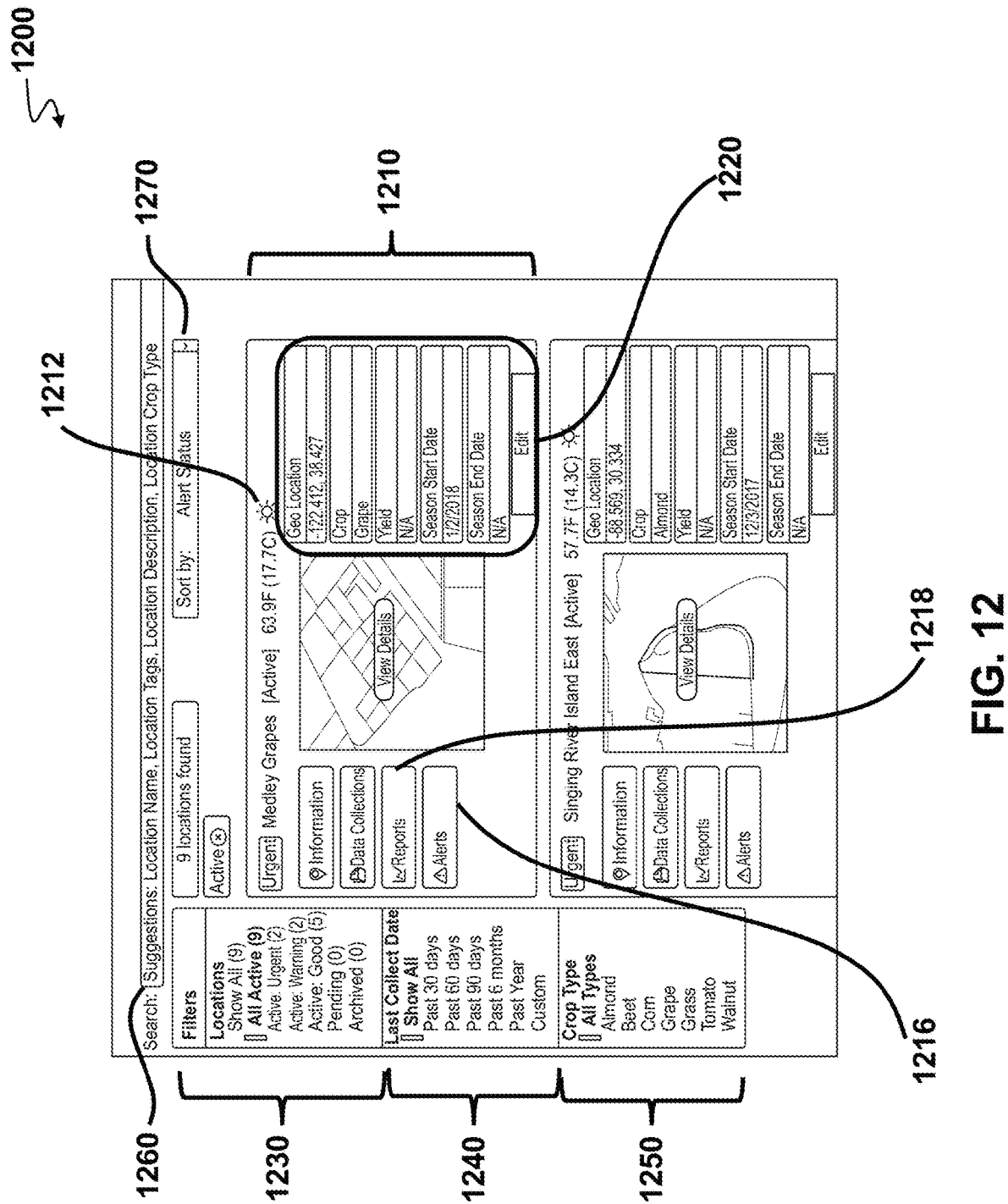
FIG. 12 depicts a screenshot of a cloud-based image management system Dashboard screen.

FIG. 12 depicts a screenshot of a cloud-based image management system Dashboard screen. In many embodiments, the Dashboard screen 1200 may include a plurality of sections including, but not limited to, a location summary section 1210, an alert filter section 1230, a last collect date filter section 1240, and a crop type filter section 1250. The location summary section 1210 may provide a variety of information regarding a single land area to be monitored. In numerous embodiments, the Dashboard screen 1200 may include multiple location summary screens 1210. In a number of embodiments, the location summary section 1210 may include a weather report 1212, a visual map of the area, a reports view button 1218, an alerts view button 1216, and a details summary list section 1220, a warning indicator, a data collections button, and an information button. In numerous embodiments, the summary list section may include information including, but not limited to, the geo-location of the land as latitude and longitude points, the type of crop in the land area, the yield of the land area, the season start date, and the season end date. In additional embodiments, the summary list section 1220 may be editable by the user to determine what information is shown in the summary list section 1220. In still additional embodiments, the location summary section 1210 may be duplicated for multiple areas of land and provided to the user as a list of available plots of land to evaluate. In still yet additional embodiments, the reporting screen may provide the user filtering sections 1230, 1240, 1250 to filter the list of location summary sections provided for viewing. In further embodiments, an alert filter section 1230 may provide a series of filters based upon alerts including, but not limited to, all active alerts, all active urgent alerts, all active warnings, all active good lands, all pending alerts, and archived alerts.

In still further embodiments, a last collect date filter section 1240 may provide a filter selection that allows for the display of location summary sections that were collected in the past thirty days, sixty days, ninety days, six months, and/or past year. These last collect date alerts may be customized and changed to any type of date range based upon the requirements of the specific application. Additionally, in still yet further embodiments, a crop type filter section 1250 may provide a filter selection based upon the type of crops that may be planted on each of the location summary section 1210 lands. In a variety of embodiments, the Dashboard 1200 may include a search bar 1260 that may allow for the input of search terms to filter the summary sections 1210. In still yet further embodiments, a drop-down menu 1270 may be provided to sort the summary sections 1210. In further additional embodiments, the filter selection types may include location tags.

Figure 13:
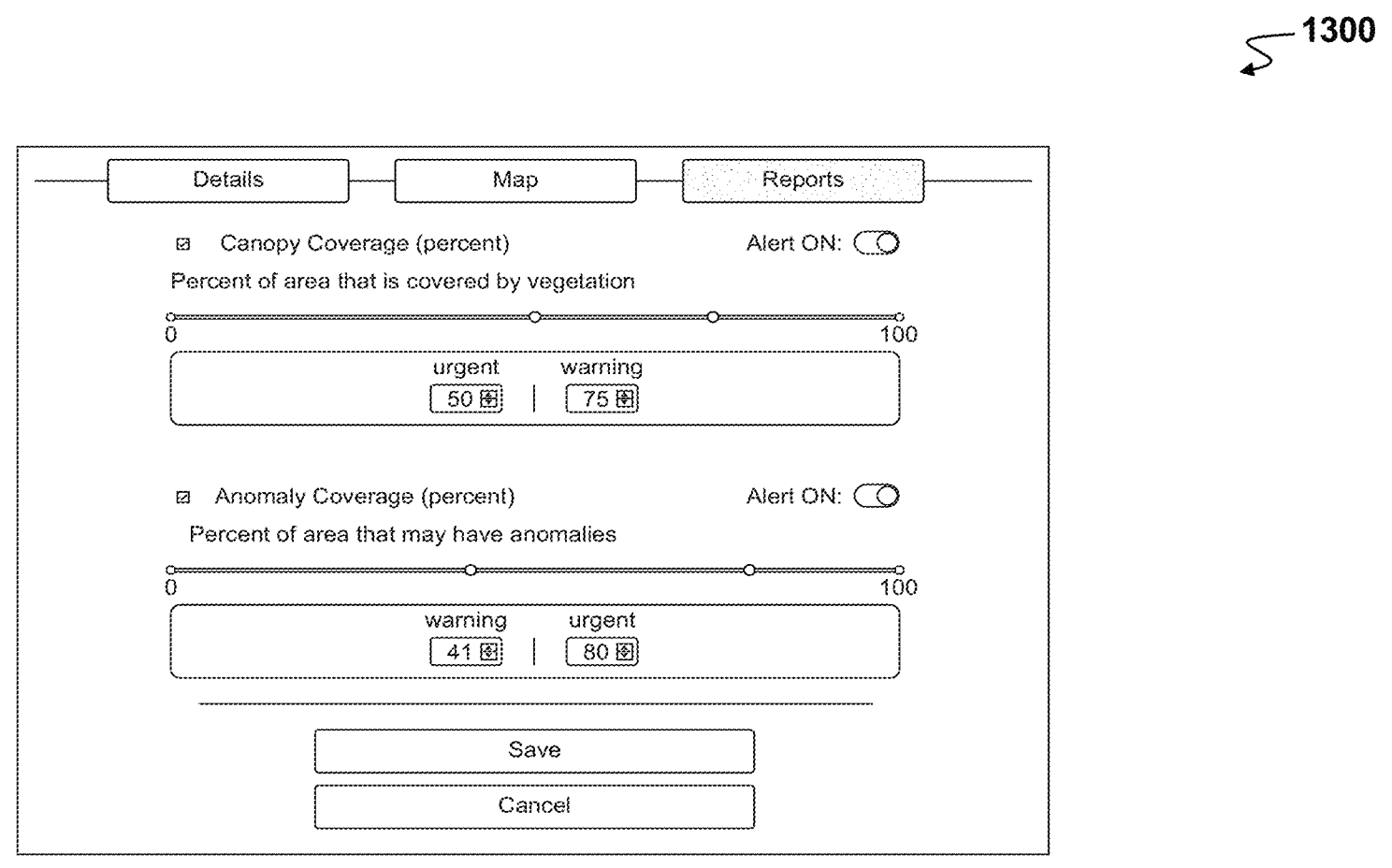

FIG. 13 depicts an illustration of a report generation screen 1300, in accordance with an embodiment of the invention. In many embodiments, the report generator 1300 may allow for the generation of a report based upon inputs by the user based upon the requirements and/or desires of the user. The inputs may include a canopy coverage percent, where the canopy coverage percent is a percent of the area covered by vegetation. The inputs may also include an anomaly coverage percent, where the anomaly coverage percent may be a percent of the area that may have anomalies. The canopy coverage and/or anomaly coverage alerts may be toggled on or off by a user.

Figure 14:
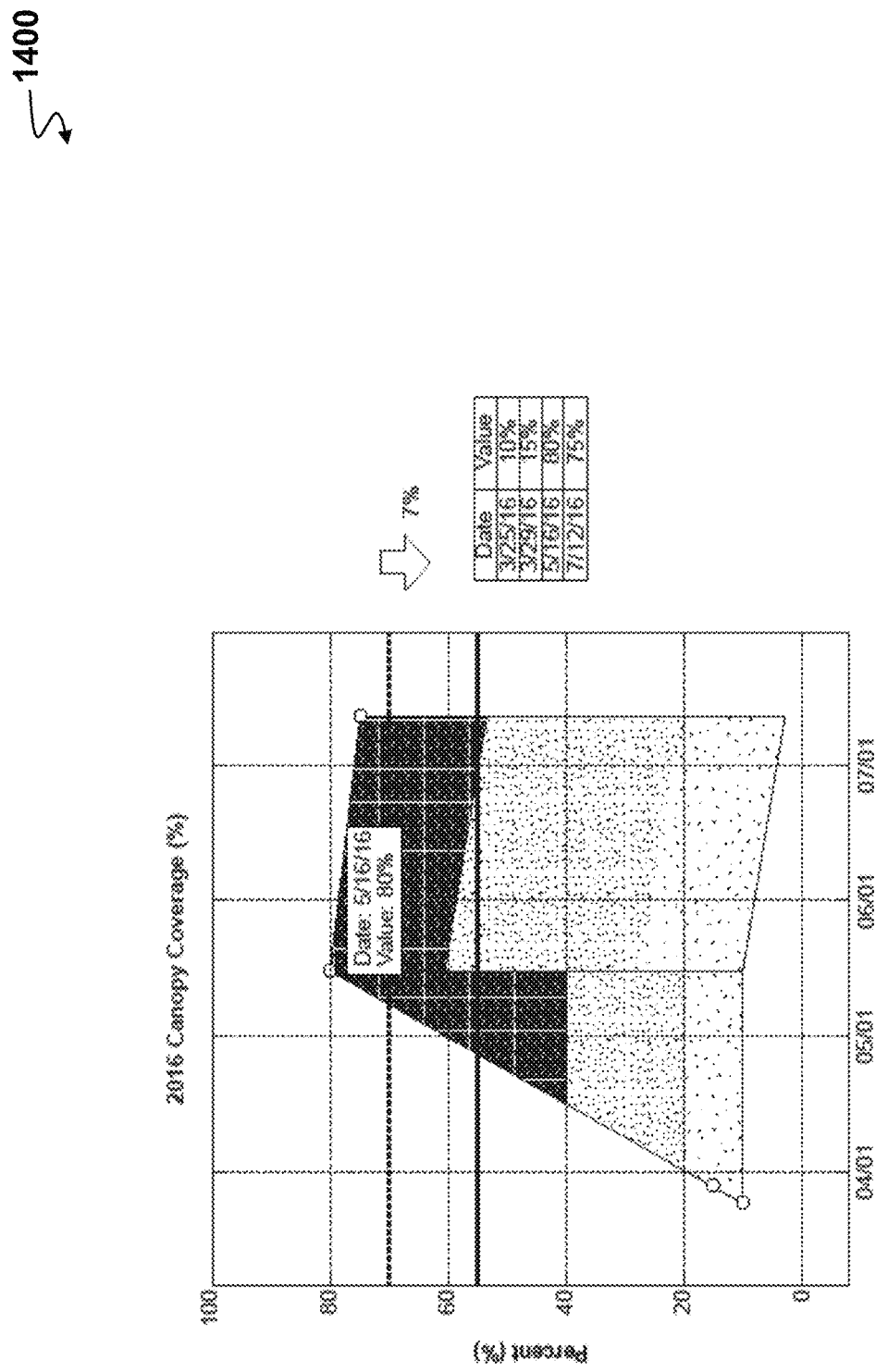
FIG. 14 depicts an illustration of a report output chart, in accordance with an embodiment of the invention.

FIG. 14 depicts an illustration of a report output chart 1400, in accordance with an embodiment of the invention. In many embodiments, the reporting screen may be in the form of a line chart. In numerous embodiments, the line graph may be a graph of a variable graphed as a percentage over time. In further embodiments, the points of the line chart may include data collected from past collection dates.

Figure 15:
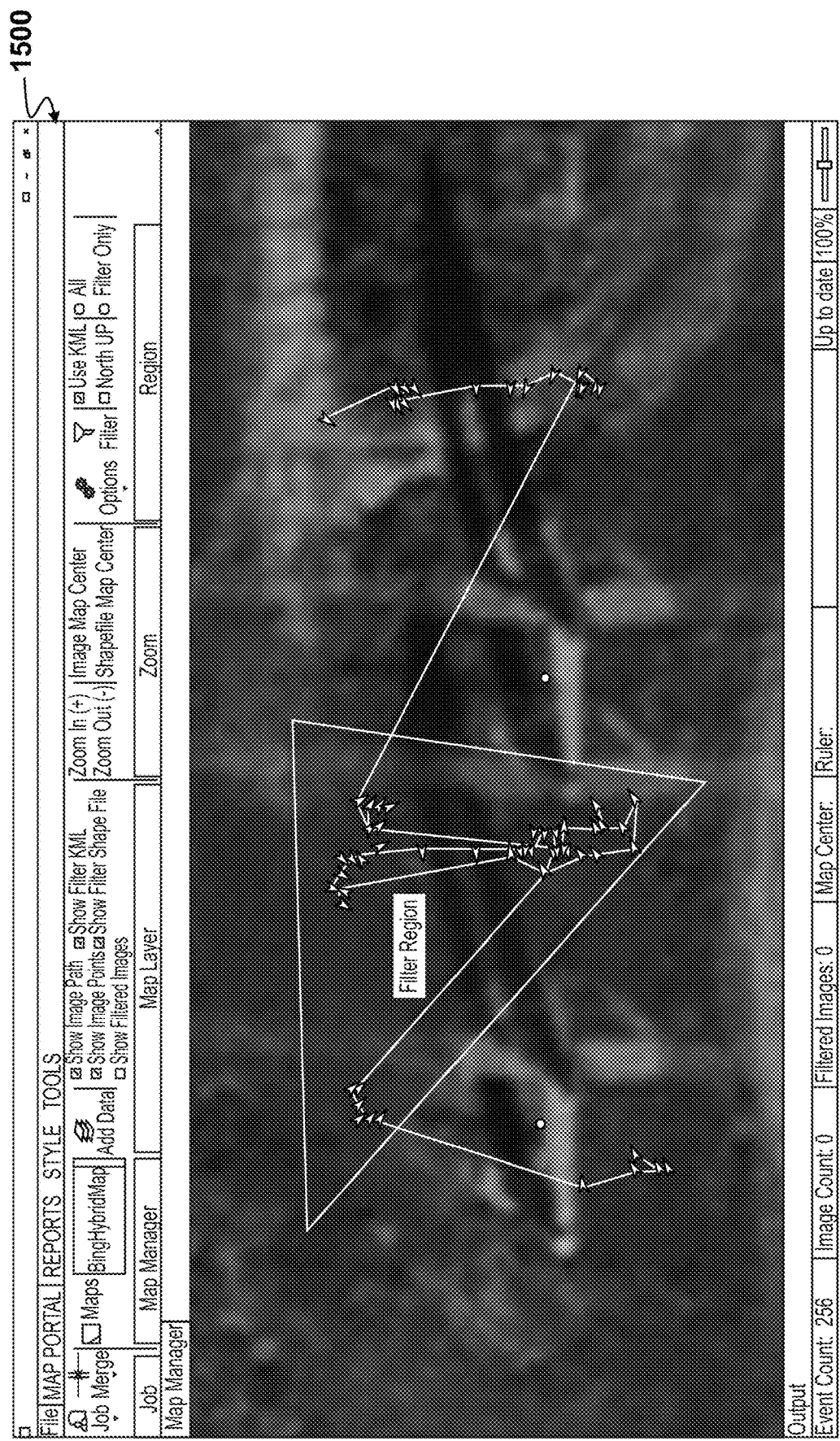
FIG. 15 depicts an illustration of a geotagger map portal screen, in accordance with an embodiment of the invention.

FIG. 15 depicts an illustration of a geotagger map portal screen, in accordance with an embodiment of the invention. Numerous cameras may generate images that may not be geotagged. These images may, in some cases, provide latitude and/or longitude points of the center point or the four corners of the image. In many embodiments, geotagger tools 1500 may allow for the ability to geotag all images in a similar manner. In a number of embodiments, the geotagger tool 1500 can co-relate images to actual collection points on the ground.

Figure 16:
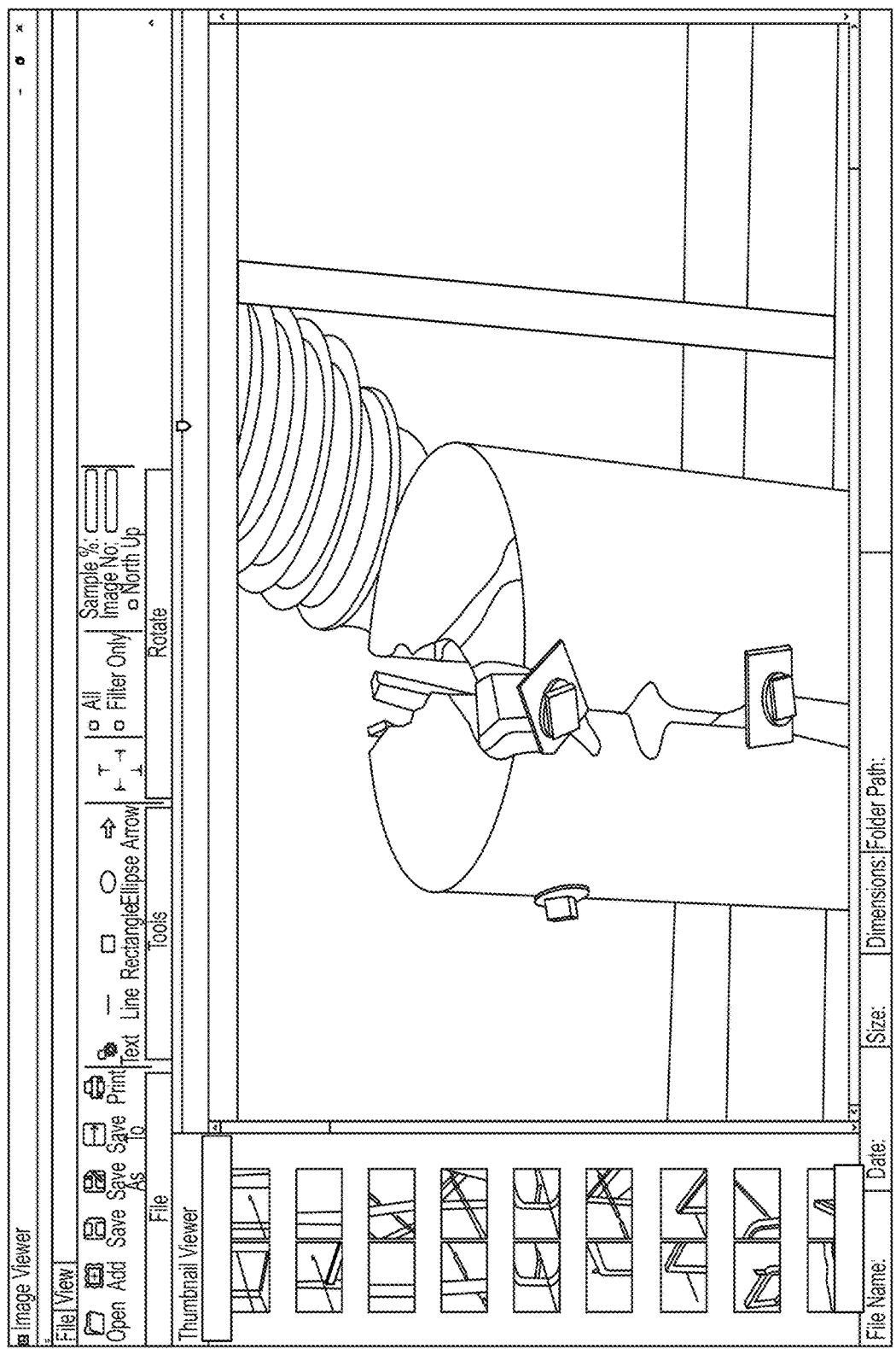
FIG. 16 depicts an illustration of a geotagger image view screen, in accordance with an embodiment of the invention.

FIG. 16 depicts an illustration of a geotagger image view screen 1600, in accordance with an embodiment of the invention. The geotagger image view screen 1600 may contain one or more images to be viewed.

Figure 17:
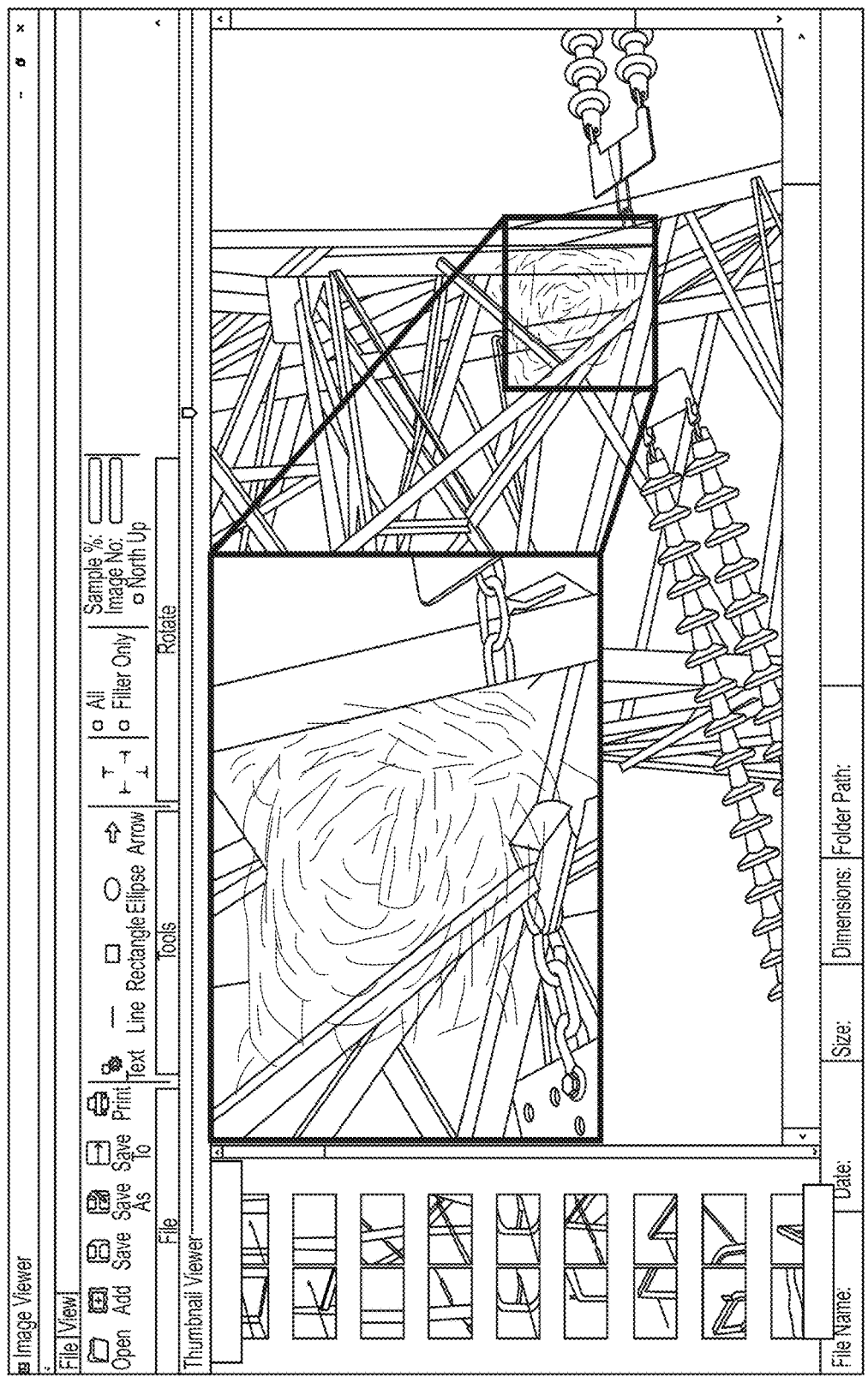
FIG. 17 depicts an illustration of a geotagger annotated image view screen, in accordance with an embodiment of the invention.

FIG. 17 depicts an illustration of a geotagger annotated image view screen 1700, in accordance with an embodiment of the invention. The geotagger annotated image view screen 1700 may include one or more images to be viewed and/or annotated. For example, FIG. 17 depicts a bird's nest disposed on a structure. The image may be viewed and annotated for future removal of the debris on the structure.

Figure 18:
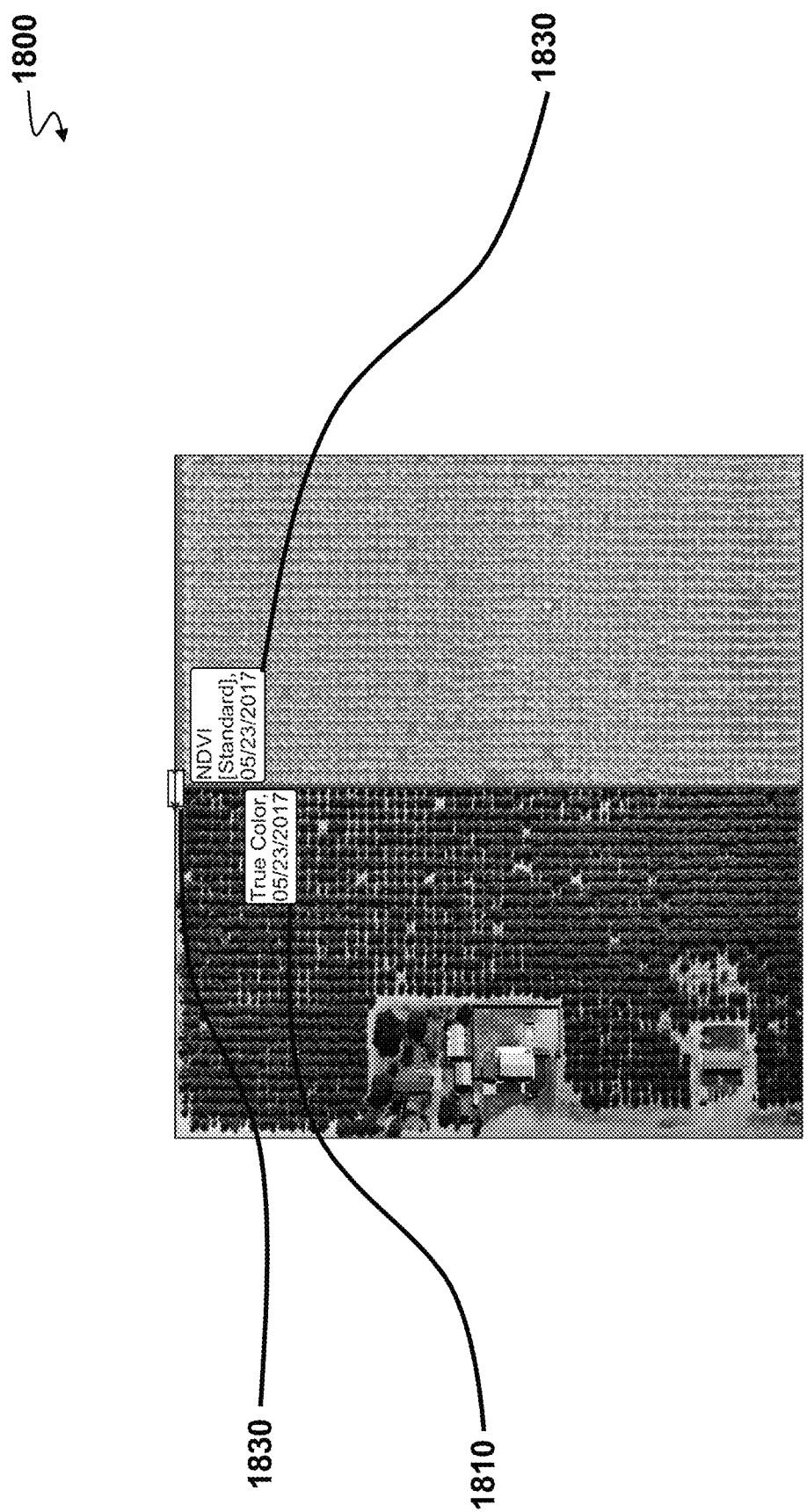
FIG. 18 depicts a swipe tool in accordance with an embodiment of the invention.

FIG. 18 depicts a swipe tool in accordance with an embodiment of the invention. In numerous embodiments, the cloud-based image management system can include a swipe tool 1800 to easily compare and contrast two different captured images 1810, 1820. In additional embodiments, the swipe tool may provide a way to evaluate a first set of image data 1810 next to a second set of image data 1820. In yet additional embodiments, the first 1810 or second 1820 set of image data may be a combination of multi-spectral images selected by the user based upon the application desired. In still additional embodiments, the swipe tool may be displayed as a line 1830 across the viewing area that can be manipulated and moved by the user such that the first set of image data 1810 is on one side of the line and the second set of image data 1820 is on the opposite side of the line. In still yet additional embodiments, the first 1810 and second 1820 set of image data may be of the same determined area but captured at different times. Moving the line to the left may reveal more of the second 1820 set of image data. Moving the line to the right may reveal more of the first set of image data.

Figure 19:
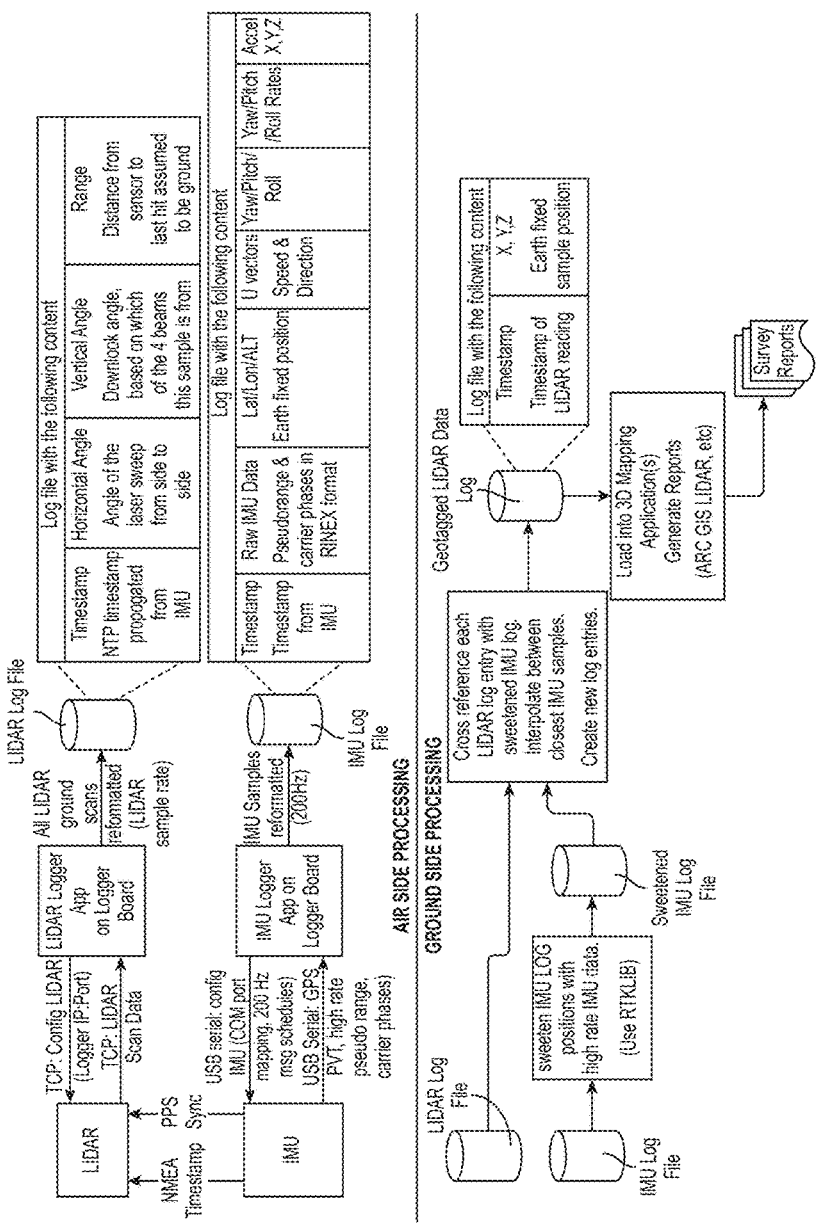
FIG. 19 depicts a LIDAR processing flowchart, in accordance with an embodiment of the invention.

FIG. 19 depicts a LIDAR processing flowchart, in accordance with an embodiment of the invention. LIDAR is an acronym for light detection and ranging. LIDAR differs from photogrammetry in that photogrammetry uses passive light and LIDAR employs an active laser system. In many embodiments, LIDAR may be utilized to yield an intensity with the XYZ data to provide a black and white-type image. In a variety of embodiments, the LIDAR merger capability may provide for the ability to take raw LIDAR data collected from an aerial platform for pre-processing. In additional embodiments, the collection of the LIDAR data may include the ability to see the area where the collection is occurring in real-time. By way of example and not limitation, collected areas may be shown as a red painted area to the user via a user interface, which can aid the user in determining gaps in collection. In further embodiments, real-time LIDAR data collection can allow for the redirection of an aerial vehicle to collect missing data prior to completing the flight mission. In still further embodiments, LIDAR processing is done at the UAV (air side) and on the ground (ground side).

The air side processing may include IMU and LIDAR. The LIDAR may receive an NMEA timestamp and PPS sync from the IMU. A LIDAR logger app on Logger Board may receive LIDAR scan data from the LIDAR via TCP and send configured LIDAR via TCP. A LIDAR Log File may receive all LIDAR ground scans reformatted from the LIDAR Logger App on Logger Board. The LIDAR Log File may include a timestamp, horizontal angle, vertical angle and range. The timestamp may be an NTP timestamp propagated from IMU. The horizontal angle may be an angle of laser sweep from side to side. The vertical angle may be a downlook angle, based on which of the four beams the sample is from. The range may be a distance from sensor to last hit assumed to be the ground.

An IMU Logger App on Logger Board may receive GPS, PVT, high rate pseudorange, and carrier passes from the IMU via a USB serial. The IMU Logger App on Logger Board may provider config IMU to the IMU via a USB serial. An IMU Log File may receive IMU samples reformatted from the IMU Logger App on Logger Board. The IMU Log File may contain a timestamp, raw IMU data, Latitude and longitude and altitude of Earth-fixed position, U vectors, speed and direction, yaw, pitch, and roll, yaw rates, pitch rates, and roll rates, and acceleration in x, y, and z-axes. The Timestamp may be a timestamp from the IMU. The raw IMU data may be pseudorange and carrier phases in RINEX format.

The ground side processing may include the LIDAR log file and the IMU log file. The IMU log file may be sweetened with IMU log positions with high rate IMU data. The LIDAR Log file and the sweetened IMU log file may be cross-referenced and interpolated between closest IMU samples. New log entries may be created. The geotagged LIDAR data may contain a log file with a timestamp of the LIDAR reading, and an x, y, and z Earth-fixed sample position. The geotagged LIDAR data log may be loaded into one or more mapping components and one or more survey report may be generated.

Figure 20:
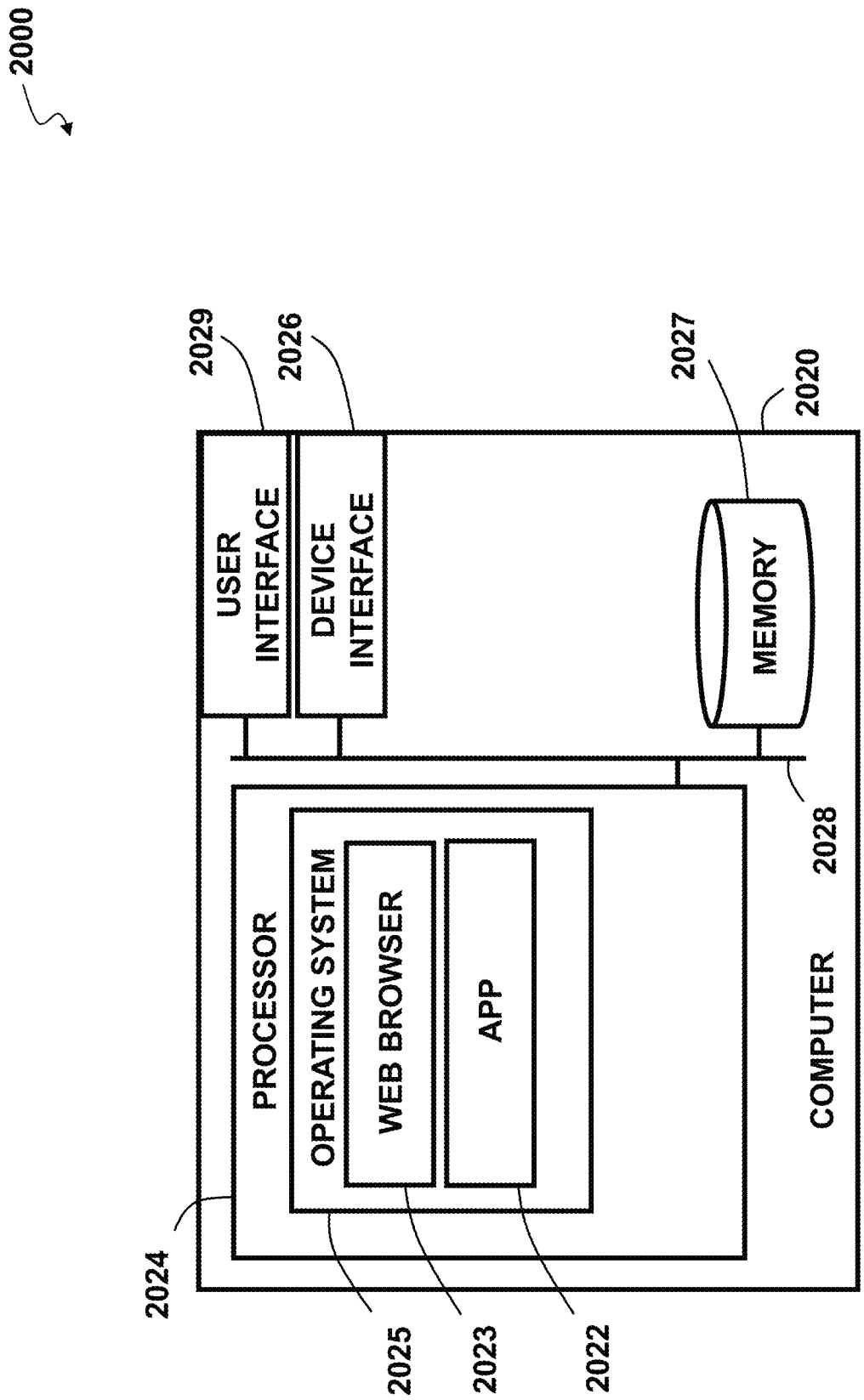
FIG. 20 illustrates a top-level functional block diagram of a computing device embodiment of a cloud-based image management system.

FIG. 20 illustrates a top-level functional block diagram of a computing device embodiment of a cloud-based image management system. The embodiment 2000 is shown as a computing device 2020 having a processor 2024, such as a central processing unit (CPU), addressable memory 2027, an external device interface 2026, e.g., an optional universal serial bus port and related processing, and/or an Ethernet port and related processing, and an optional user interface 2029, e.g., an array of status lights and one or more toggle switches, and/or a display, and/or a keyboard and/or a pointer-mouse system and/or a touch screen. Optionally, the addressable memory 2027 may for example be: flash memory, eprom, and/or a disk drive or other hard drive. These elements may be in communication with one another via a data bus 2028. The processor 2024 may have an operating system 2025 such as one supporting a web browser 2023 and/or applications 2022, which may be configured to execute steps of a process according to the embodiments described herein.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method comprising:
   capturing image data via a vertical take-off and landing (VTOL) aerial vehicle;
   transmitting the captured image data to a server having a processor and addressable memory via a network-connected computing device;
   correlating, by an image management component, a first captured image data with a second captured image data; and
   displaying, by the image management component, both the first captured image data and the second captured image data concurrently, wherein a visual dividing line separates the first captured image data from the second captured image data, the visual dividing line being moveable by a user.

2. The method of claim 1, further comprising:
   storing the captured image data on the server;
   generating captured image metadata based on the stored captured image data; and
   providing access to the captured image data and captured image metadata via the image management component.

3. The method of claim 2, further comprising:
   displaying, by the image management component, the captured image data; and
   filtering, by the image management component, the captured image data based on the generated captured image metadata.

4. The method of claim 1, wherein a timestamp associated with the first captured image data is different from a timestamp associated with the second captured image data.

5. The method of claim 1, wherein the VTOL aerial vehicle comprises a plurality of sensors.

6. The method of claim 5, wherein the plurality of sensors comprise an RGB sensor.

7. The method of claim 5, wherein the plurality of sensors comprise a LIDAR sensor.

8. The method of claim 5, wherein the plurality of sensors comprise one or more multi-spectral cameras.

9. The method of claim 1, further comprising:
   co-registering, by the image management component, the captured image data with at least one pre-loaded image to a high level of precision.

10. The method of claim 3, further comprising:
    filtering, by the image management component, the displayed captured image data based on a plurality of spectrums selected by the user.

11. A method comprising:
    defining a ground region for capturing one or more images;
    receiving image data of the defined ground region from an aerial vehicle and one or more satellite images, wherein the aerial vehicle is a vertical take-off and landing (VTOL) aerial vehicle;
    processing the image data;
    providing access to the processed image data via an image management component;
    correlating, by the image management component, a first captured image data with a second captured image data; and
    displaying, by the image management component, both the first captured image data and the second captured image data concurrently, wherein a visual dividing line separates the first captured image data from the second captured image data, the visual dividing line being moveable by a user.

12. The method of claim 11, further comprising:
    associating each received image data from the one or more satellites with a respective latitude and longitude; and
    co-locating each received image data from the aerial vehicle with the received image data from the one or more satellites.

13. The method of claim 11, further comprising:
    storing the processed image data.

14. The method of claim 11, wherein the VTOL aerial vehicle is a VTOL unmanned aerial vehicle (UAV).

15. The method of claim 11, wherein the received image data comprises multi-spectral images of the pre-defined ground region, and wherein the multi-spectral images comprise at least one of: red, green, blue, infra-red, and ultra-violet spectrums.

16. The method of claim 15, wherein a timestamp associated with the first captured image data is different from a timestamp associated with the second captured image data.

17. The method of claim 11, further comprising, prior to storing the image data:
    verifying an integrity of the received image data, wherein verifying the integrity of the received image data comprises scanning the received image data for viruses.

18. The method of claim 11, further comprising:
adding at least one of: a season date range for the defined ground region, one or more crop types for the defined ground region, one or more tags to the stored image data, and one or more notes to the stored image data via a dashboard component.

19. The method of claim 11, further comprising:
determining a canopy coverage data of the defined ground region based on the stored image data, wherein the determined canopy coverage is based on a percent of the defined ground region that is covered by vegetation;
determining an anomaly level of the defined ground region based on the stored image data, wherein the determined anomaly level is based on a percent of the defined ground region that may have anomalies; and
sending a message when the determined anomaly level exceeds a set amount.

20. The method of claim 11, further comprising:
generating a normalized difference vegetation index (NDVI) profile of the defined ground region based on the stored image data.

\* \* \* \* \*